United States Patent
Curliss et al.

(10) Patent No.: US 9,725,314 B2
(45) Date of Patent: *Aug. 8, 2017

(54) CONTINUOUS PROCESS FOR THE PRODUCTION OF CARBON NANOFIBER REINFORCED CONTINUOUS FIBER PREFORMS AND COMPOSITES MADE THEREFROM

(75) Inventors: David B. Curliss, Beavercreek, OH (US); Jason E. Lincoln, Englewood, OH (US)

(73) Assignee: Performancy Polymer Solutions, Inc., Moraine, OH (US)

( * ) Notice: Subject to any disclaimer, the term of this patent is extended or adjusted under 35 U.S.C. 154(b) by 688 days.

This patent is subject to a terminal disclaimer.

(21) Appl. No.: 12/041,504

(22) Filed: Mar. 3, 2008

(65) Prior Publication Data

US 2009/0220409 A1  Sep. 3, 2009

(51) Int. Cl.
| | |
|---|---|
| *D01F 9/127* | (2006.01) |
| *D01F 9/133* | (2006.01) |
| *B82B 1/00* | (2006.01) |
| *B82B 3/00* | (2006.01) |
| *B82Y 30/00* | (2011.01) |
| *B01J 6/00* | (2006.01) |
| *B01J 19/22* | (2006.01) |
| *B01J 23/745* | (2006.01) |
| *B01J 23/75* | (2006.01) |
| *B01J 23/755* | (2006.01) |
| *B01J 35/06* | (2006.01) |
| *B01J 37/02* | (2006.01) |
| *B01J 37/08* | (2006.01) |
| *B29B 11/16* | (2006.01) |
| *C08J 5/00* | (2006.01) |
| *D01F 1/10* | (2006.01) |

(52) U.S. Cl.
CPC ............. *B82Y 30/00* (2013.01); *B01J 6/008* (2013.01); *B01J 19/22* (2013.01); *B01J 23/745* (2013.01); *B01J 23/75* (2013.01); *B01J 23/755* (2013.01); *B01J 35/06* (2013.01); *B01J 37/0203* (2013.01); *B01J 37/084* (2013.01); *B29B 11/16* (2013.01); *C08J 5/005* (2013.01); *D01F 1/10* (2013.01); *D01F 9/127* (2013.01); *C08J 2300/00* (2013.01); *C08J 2379/08* (2013.01)

(58) Field of Classification Search
USPC ............................................ 423/447.1, 447.2
See application file for complete search history.

(56) References Cited

U.S. PATENT DOCUMENTS

| | | | |
|---|---|---|---|
| 5,024,818 A | 6/1991 | Tibbetts et al. | |
| 5,165,909 A | 11/1992 | Tennent et al. | |
| 5,374,415 A | 12/1994 | Alig et al. | |
| 6,235,674 B1 | 5/2001 | Tennent et al. | |
| 6,495,258 B1 | 12/2002 | Chen et al. | |
| 7,338,684 B1 | 3/2008 | Curliss et al. | |
| 2003/0236588 A1* | 12/2003 | Jang et al. ................... 700/119 |
| 2004/0029706 A1* | 2/2004 | Barrera et al. ................. 501/99 |
| 2004/0245088 A1* | 12/2004 | Gardner ........................ 204/173 |
| 2005/0152826 A1* | 7/2005 | Shatwell .................... 423/447.3 |
| 2005/0176329 A1* | 8/2005 | Olry et al. .................... 442/388 |
| 2006/0165914 A1* | 7/2006 | Abrahamson ................ 427/580 |
| 2007/0189953 A1 | 8/2007 | Bai et al. | |
| 2008/0075954 A1* | 3/2008 | Wardle et al. ................ 428/339 |
| 2009/0081383 A1* | 3/2009 | Alberding et al. ........... 427/577 |

FOREIGN PATENT DOCUMENTS

| | | | |
|---|---|---|---|
| CA | 2 498 808 | 9/2003 | |
| WO | WO 01/85612 | 11/2001 | |
| WO | WO 03/072497 | 9/2003 | |
| WO | WO 03/082733 | 10/2003 | |
| WO | WO 2004/025003 | 3/2004 | |
| WO | WO 2008/085634 | * 7/2008 | ............. D01F 9/127 |

OTHER PUBLICATIONS

S. Zhu, C.-H. Su, S.L. Lehoczky, I. Muntele, D. Ila. Carbon nanotube growth on carbon fibers, Diamond Relat. Mater. 2003, 12, 1825-1828.*

Q. Zhang, W. Qian, R. Xiang, R. Xiang, Z. Yang, G. Luo, Y. Wang, F. Wei. In situ growth of carbon nanotubes on inorganic fibers with different surface properties, Mater. Chem. Phys. 2008, 107, 317-321.*

L.J. Ci, Z.G. Zhao, J.B. Bai. Direct growth of carbon nanotubes on the surface of ceramic fibers, Carbon 2005, 43, 883-886.*

Th.D. Makris, R. Giorgi, N. Lisi, E. Salernitano. Carbon Nanotubes growth and anchorage to carbon fibres, Carbon Nanotubes 2006, 57.*

Z.-G Zhao, L.-J. Ci, H.-M. Cheng, J.-B. Bai. The growth of multi-walled carbon nanotubes with different morphologies on carbon fibers, Carbon 2005, 43, 651-673.*

A. Laachachi, A. Vivet, G. Nouet, B.B. Doudou, C. Poilane, J. Chen, J.B. Bai, M. Ayachi. A chemical method to graft carbon nanotubes onto a carbon fiber, Mater. Lett. 2008, 62, 394-397.*

(Continued)

*Primary Examiner* — Carlos Barcena
(74) *Attorney, Agent, or Firm* — Endurance Law Group, PLC

(57) ABSTRACT

This invention provides a continuous process for the growth of vapor grown carbon fiber (VGCNT) reinforced continuous fiber preforms for the manufacture of articles with useful mechanical, electrical, and thermal characteristics. Continuous fiber preforms are treated with a catalyst or catalyst precursor and processed without vaporization of the preform to yield VGCNT produced in situ resulting in a highly entangled mass of VGCNT infused with the continuous fiber preform. The continuous process disclosed herein provides denser and more uniform carbon nanotubes and provides the opportunity to fine-tune the variables both within an individual preform and between different preforms depending on the characteristics of the carbon nanotubes desired. The resulting continuous fiber preforms are essentially endless and are high in volume fraction of VGCNT and exhibit high surface area useful for many applications. The invention also provides for composites made from the preforms.

47 Claims, 9 Drawing Sheets

(56) References Cited

OTHER PUBLICATIONS

H.G. Chae, T.V. Sreekumar, T. Uchida, S. Kumar. A comparison of reinforcement efficiency of various types of carbon nanotubes in polyacrylonitrile fiber, Polymer 2005, 46, 10925-10935.*

Th. Dikonimos Makris, R. Giorgi, N. Lisi, L. Pilloni, and E. Salernitano. Carbon Nanotube Growth on PAN- and Pitch-Based Carbon Fibres by HFCVD, Fullerenes, Nanotubes, and Carbon Nanostructures 13: 383-392, 2005.*

Shen Zhua, Ching-Hua Su, S.L. Lehoczky, I. Muntele, D. Ila. Carbon nanotube growth on carbon fibers, Diamond and Related Materials 12: 1825-1828, 2003.*

L.J. Ci, Z.G. Zhao, J.B. Bai, Direct growth of carbon nanotubes on the surface of ceramic fibers, Carbon 43, 2005, 883-886.*

Q.-M Gong, Z. Li, Z.-W. Zhou, J.-J. Wu, Y. Wang, J. Liang. Synthesis and characterization of in situ grown carbon nanofiber/nanotube reinforced carbon/carbon composites, Letters to the Editor / Carbon 43 (2005) 2397-2429.*

Y.-S. Lim, W. S. Kim, S. Y. Moon, D. Y. Han, J. Lee. Growth of Carbon Nanotubes on Surface of Carbon Fibers Rod, Key Engineering Materials vols. 317-318 (2006) pp. 259-262.*

Z.-G Zhao, L.-J. Ci, H.-M. Cheng, J.-B. Bai. The growth of multi-walled carbon nanotubes with different morphologies on carbon fibers, Letters to the Editor / Carbon 43 (2005) 651-673.*

Wilson K.S. Chiu and Yogesh Jaluria. Continuous chemical vapor deposition processing with a moving finite thickness susceptor, J. Mater. Research, vol. 15, No. 2, Feb. 2000, 317-328.*

Hernadi, et al., "Fe Catalyzed Carbon Nanotube Formation," Carbon, 34(10), 1249, 1996.

Yacaman, M. J. et al., "Catalytic Growth of Carbon Microtubules with Fullerene Structure," Applied Physics Letters, 62, 657, 1993.

Ivanov, et al., "Catalytic Production and Purification of Nanotubules Having Fullerene Scale Diameters," Carbon, 33(12), 1727, 1995.

Li, et al., "Controlled Growth of Carbon Nanotubes on Graphite Foil by Chemical Vapor Deposition," Chem. Phys. Letters, 335, 141, 2002.

Thostenson, E. T., et al., "Carbon Nanotube/Carbon Fiber Hybrid Multi-Scale Composites," Journal of Applied Physics, 91(9), 6034, 2002.

Ren et al., Effect of temperature on growth and structure of CNT by chemical vapor deposition Applied Physics A, 2002, 74, p. 397-402.

Hernadi, Fonesca et al. Synthesis of Single wall and Multi wall carbon nanotubes over supported catalysts Applied Physics A, 1998, vol. 67, p. 11-22.

Hernadi, Fonesca et al. Optimization of catalytic production and purification of buckytubes Journal of Molecular Catalysis—A: Chemical, 107, 1996 p. 159-168.

Zhao et al. "Growth of carbon nanotube on the surface of carbon fibers", Carbon, Elsevier, Oxford, GB, vol. 46, No. 2, Dec. 31, 2007, p. 380-383. XP022483014.

E.T. Thostenson, et. Al., "Carbon Nanotube/Carbon Fiber Hybrid Multiscale Composites", Journal of Applied Physics, vol. 91, No. 9, 2002 America Institute of Physics, May 1, 2002, pp. 6034-6037.

* cited by examiner

STEP 1: Preform Catalyst Treatment

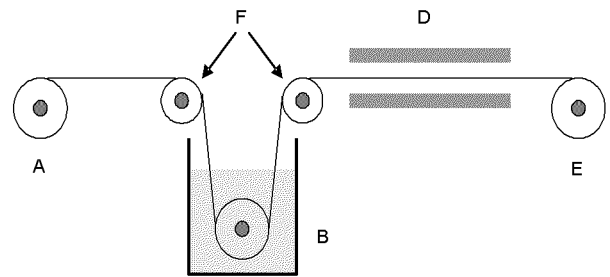

A. As received continuous yarn
   -Unsized or Sized
   - Carbon, Ceramic, Glass, Quartz, etc.
B. Catalyst solution treatment bath (100mM Fe(NO$_3$)$_3$ IN 50:50 Acetone:Ethanol
C. Rewind catalyst treated yarn
D. Drying oven section (convection RT to ~120°C)
E. Yarn Rewinding
F. Redirect Rolls

FIG. 6

STEP 2: Preform Pyrolysis

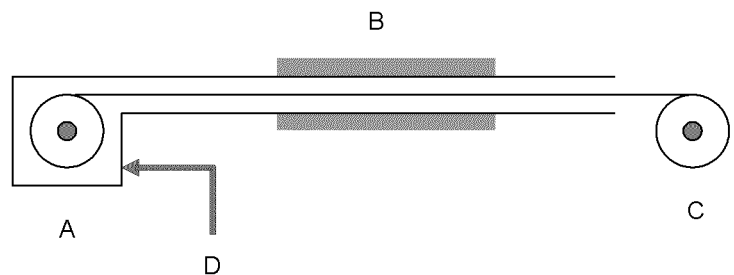

A. Catalyst treated yarn/textile/preform
      - Inert atmosphere purged
B. Catalyst pyrolysis tube furnace (300°C to 900°C, 500°C-600°C for 1-15min preferred)
C. Rewind heat treated, burn-off yarn
D. Inert gas purge into yarn/tube furnace (Nitrogen)

FIG. 7

STEPS 3/4: Continuous catalyst heat-treatment and Nanofiber growth

STEPS 3/4: Continuous catalyst heat-treatment and Nanofiber growth process
Phase II

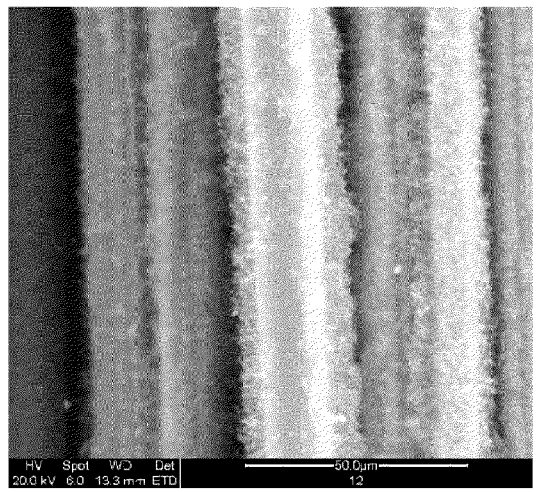 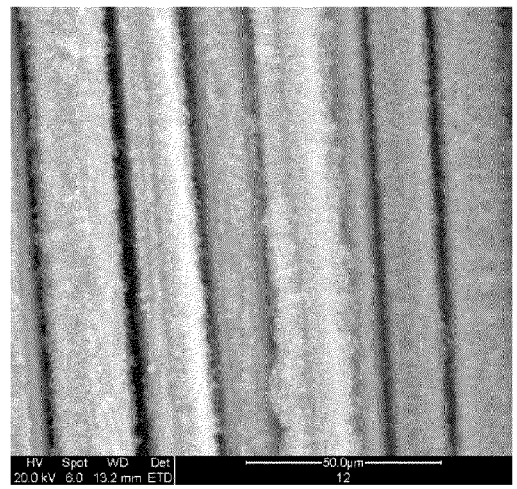
FIG. 10A  FIG. 10B
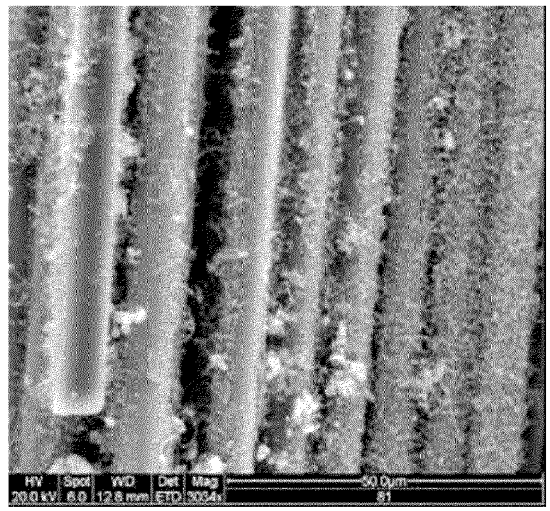 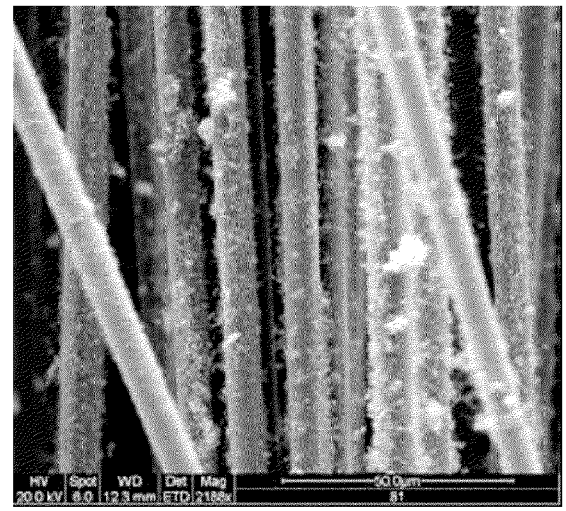
FIG. 11A  FIG. 11B

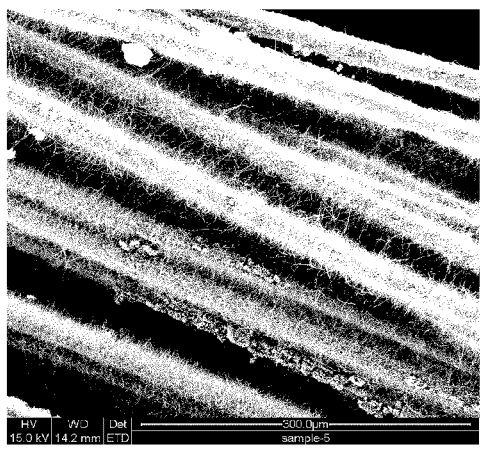
FIG. 12
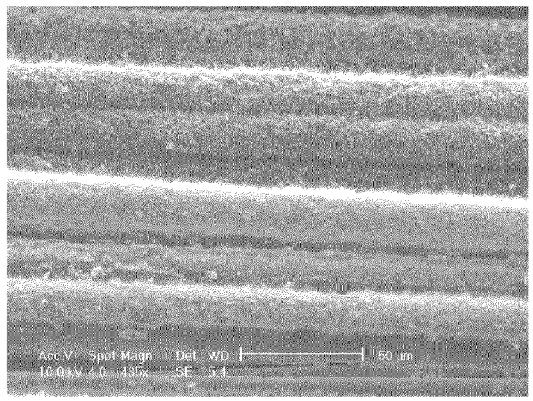 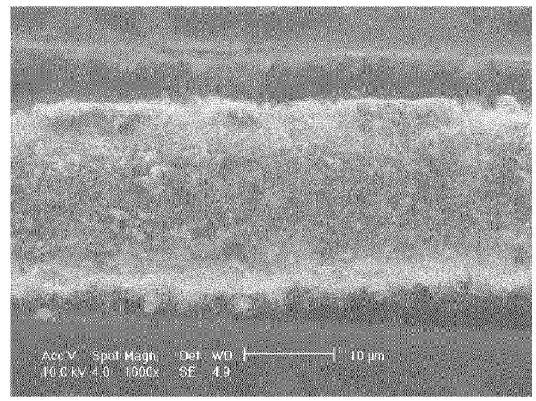
FIG. 13.

CONTINUOUS PROCESS FOR THE PRODUCTION OF CARBON NANOFIBER REINFORCED CONTINUOUS FIBER PREFORMS AND COMPOSITES MADE THEREFROM

STATEMENT AS TO RIGHTS TO INVENTIONS MADE UNDER FEDERALLY SPONSORED RESEARCH OR DEVELOPMENT

This work was supported in part by an award from the United States government N68335-05-C-0394. The Government of the United States may have certain rights in this invention.

FIELD OF THE INVENTION

This invention relates to a novel continuous process to fabricate continuous fiber composites reinforced with vapor grown carbon nanotubes (VGCNT). In particular, the invention relates to a continuous process for the production of continuous fiber preforms useful in the making of carbon nanotube reinforced composite articles.

BACKGROUND OF THE INVENTION

Idealized Carbon Nanotubes (CNT) can be visualized as 3-D graphite sheets rolled to form seamless cylinders, closed with end caps on both the sides. These end caps have fullerene like structure. A defect free nanotube has exceptional mechanical, electrical and thermal properties. The defects can be in the structure or in the morphology. These structures have stability greater than that of graphite, thermally as well as chemically. Based on the diameter of the nanotubes, CNTs are broadly classified into: (1) Single Wall Carbon Nanotubes; (2) Multi Wall Carbon Nanotubes; and (3) Carbon Nanofibers.

Since carbon nanotubes have such extraordinary mechanical properties, one would expect that, when these are embedded into some other matrix material, the properties of the matrix would improve drastically. But, this actually does not happen. This is because of poor load transfer between the nanotubes and matrix. Nanotubes are chemically very inert and are not compatible with any other material in their pristine state. Also, because nanotubes are typically not well-dispersed, they create stress concentrations and the high surface area of the nanotubes is compromised. To fabricate composites with improved properties, it is important to modify the surface of the nanotubes so as to achieve a good interface and at the same time, improve the dispersion of the carbon nanotubes in the matrix. The poor dispersion and poor interfacial interactions between the nanotubes and the matrix also result in lower than expected electrical and thermal properties in the resulting composite material.

To more optimally fabricate such composites, various modifications have been proposed. Instead of dispersing the nanotubes in the matrix and then using the matrix to make composite structures, an attempt is made to grow the nanotubes on the composite preforms and then fill the preforms with matrix material. Using this procedure, the problem of dispersion of nanotubes can be by-passed.

The present invention is useful for applications in numerous industries including composite materials, filtration materials, electrodes, membranes, cell growth supports, catalysis, and many other novel and emerging applications that will benefit from this unique technology. In particular, the present invention relates to novel non-woven, woven and braided continuous fiber composite preforms that are subsequently reinforced with vapor grown carbon fibers that are grown in situ in the preform using a continuous growth process, the preforms so made and composite articles made using the preform. The resulting continuous fiber VGCNT reinforced composite preform exhibits increased fiber volume fraction of reinforcing fibers and greatly increased surface area thus improving the strength, stiffness, electrical conductivity, and thermal conductivity of polymer matrix composites produced from these preforms while maintaining the manufacturing benefits of a continuous non-woven, braided or woven preforms. The resulting articles produced from VGCNT infused preforms produced in this way are useful for numerous applications that take advantage of the unique structural, morphological, electrical, and thermal properties.

Polymer matrix composites are well known for use in structural and thermal-structural applications. Continuous yarn, and other multidimensional 2-D and 3-D, non-woven, woven or braided, composite preforms are used in the manufacture of reinforced composites due to their economical manufacturing processes. For the purposes of this invention the term "preform" means a continuous fiber yarn, tow, or broad good produced from the tow or yarn (including non-woven mats, woven or braided constructions) and assemblies of preforms further constructed. Through weaving or braiding of the reinforcing fiber yarns of carbon or graphite (carbon and graphite fibers are generally referred to collectively as "carbon fiber" and the term "carbon fiber" is used throughout to mean "carbon and/or graphite fiber"), glass, quartz, metal or ceramic fiber a composite "preform" can be manufactured into a near net shape that is subsequently infused with a polymer resin and cured in a mold to manufacture articles.

Preforms may also be infused with a polymer or polymer resin to manufacture a prepreg useful for the fabrication of polymer matrix composite material articles. Using well-known methods the non-woven, woven or braided preforms are manipulated by slitting, combining together, stitching together, shaping, or other methods to assemble a near net shape preform for the fabrication of a composite article. The continuous fiber preform processes are advantageous since they can be used very economically to produce a variety of shapes useful in the manufacture of composites. A fundamental limitation of certain woven, braided, non-woven mat, or felt preform technology to date, however, has been that the resulting composites manufactured from these preforms are of lower strength and stiffness than composites manufactured using other methods. This is due in part to the lower fiber volume fraction that results from the weaving and braiding processes and in part to the failure mechanisms of weave braid or tow composites intrinsically related to the reinforcing fiber geometry and architecture.

A goal in composite materials design has been to obtain materials which exhibit high stiffness, strength, fracture toughness, controllable electrical and thermal properties and can be affordably manufactured. Hence, there exists a need for a novel approach to improve the stiffness, strength, fracture toughness, and the electrical and thermal properties, of woven and braided composite materials while maintaining the low cost advantages of continuous woven and braided preform manufacturing.

The present invention is concerned with the use of VGCNT produced in a composite preform to improve the mechanical, electrical, and thermal characteristics of composite materials produced from these preforms as well as novel materials and articles that can be produced from the preforms themselves. VGCF and VGCNT are produced directly from hydrocarbons such as methane, acetylene, methane, propane, ethane, ethylene, benzene, natural gas or hydrocarbon gas mixture, in a gas phase reaction upon contact with a catalytic metal particle in a non-oxidizing gas stream. Various reaction processes, conditions, and chambers are known and described in e.g., U.S. Pat. Nos. 5,024,818 and 5,374,415 for the manufacture of VGCF. Vapor grown carbon fibers differ substantially from commercial carbon fibers in that the VGCF are not continuous. The VGCF and VGCNT can vary in diameter and length depending on processing parameters, including catalyst particle characteristics, reactive gas composition, pyrolysis time and temperature, heat treatment time and temperature, and length of growth period and volume of furnace, but exhibit diameters in the range of 1 to 500 nm and lengths in the range of 0.1 μm to 500 μm.

More importantly and pertinent to this application is that the fiber diameter of a vapor grown carbon fiber is generally under 1 μm. As those familiar with the growth of vapor grown carbon fibers know, these fibers can be subsequently thickened to the diameter of commercial fibers. However, these fibers are not as desirable from an economic or performance perspective. It is desirable to use fibers that are smaller than the diameter of a commercial fiber by a factor in the range of 10 to 100.

Further, as the vapor grown carbon fibers are much finer than continuously produced carbon fibers they can be used effectively to increase the fiber volume fraction of a continuous fiber composite by occupying the void spaces between the continuous fibers. The fine diameter vapor grown carbon fibers can occupy spaces in non-woven, woven or braided composite preforms without perturbing the geometry, orientation, or continuous fiber volume fraction of the preform. The result is that the overall fiber volume fraction is increased leading to desirable changes in the mechanical, electrical, and thermal behavior of composite materials manufactured from these preforms.

A further distinctly novel advantage of this approach is that vapor grown carbon nanotubes are intimately and uniformly incorporated into a composite material. The in situ process to produce the nanotube reinforced preform ensures that nanofibers are well distributed throughout the preform and are in intimate contact with themselves and the continuous fiber of the preform. Conventionally, carbon nanotubes are grown, separated from their substrate and incorporated into a composite material by mixing and/or dispersing the nanofibers into the matrix. The nanofiber/matrix mixture is then used to prepare composites. This method has many disadvantages including cost, additional process operations, nanofiber damage from mixing, and negative impact on matrix rheology. Further, the nanofibers must be handled and possible health risks from nanofiber exposure is a concern. U.S. patent application Ser. No. 11/057,462 discloses methods in which VGCF are produced directly from catalytic particles formed on the continuous fiber surface, thus the nanofibers are fused to the continuous fiber surface and act to enhance the adhesion of the composite matrix to the continuous fiber, further improving the properties of resulting composite materials. However, the invention described in Ser. No. 11/057,462 is limited in that the continuous preform is static in the reaction vessel and is therefore limited in its length to the size of the vessel and further, the reaction conditions to which the preform is subjected.

A further distinctly novel advantage of the present invention is to change the electrical conductivity of a non-conducting composite material preform at very low levels of nanotube. It is known that carbon nanotubes can be incorporated into a polymer matrix by mixing, blending, solvent-assisted blending, or other similar techniques. At a certain fraction of nanotubes, the polymer composites made in this way become conductive due to continuous contact of the inherently conductive nanotubes. The point at which this continuous conduction occurs is commonly referred to as the "percolation threshold." In conventional nanotube composites where the nanotubes are mixed into the matrix material this typically occurs at weight fractions of nanotube to polymer of 1% to 30% depending on the nanotube morphology, mixing techniques, and other variable factors. In the novel approach described in this invention conductivity occurs at nanotube levels approximately ten times lower. This phenomenon is because the nanotubes are not broken down in aspect ratio and their intimate contact with each other is not disrupted by mixing and dispersion processes.

There are limited literature reports of attempts to produce catalytically vapor grown carbon nanotubes on graphite, carbon, quartz, glass or metal substrates. However, the methods differ substantially from the method described in this invention and none report continuous in situ production of VGCNT on carbon fiber yarns, tows, non-woven, woven or braided preforms and are thus further limited in their utility due to the limited ability to incorporate such VGCNT into a composite article.

Hernadi et al. (1996) report on VGCF produced on graphite flakes using an iron catalyst and acetylene/nitrogen gas mixture. They treated the graphite flakes with iron acetate and then reduced under hydrogen at 1200° C. to produce metallic iron particles. VGCF were subsequently produced at 700° C. in a flowing acetylene/nitrogen gas at atmospheric pressure. The reported yield was extremely low at 3.4% with poor quality nanofibers. Yacaman et al. (1993) also reported VGCF produced on graphite flakes using an iron catalyst and acetylene/nitrogen gas mixture. They treated the graphite flakes with an iron oxalate solution and reduced the catalyst to metallic iron particles under hydrogen at 350° C. VGCF were subsequently produced at 700° C. in a flowing acetylene/nitrogen gas at atmospheric pressure for several hours. They reported nanofibers were produced with diameters in the range of 5.0 to 20 nanometers and lengths of around 50 micrometers, however, after 1 hour of growth graphitic structures were noted around few catalytic particles. Ivanov et al. (1995) reported production of VGCF on graphite flakes using an iron catalyst and acetylene/nitrogen gas mixture. They treated the graphite flakes with an iron oxalate solution followed by calcination at 500° C. followed by reduction with hydrogen at 500° C. for 8 hours. Under optimal conditions they reported VGCF with average diameter of 40-100 nanometers and average length of 50 micrometers and 50% amorphous carbon. Wang et al. (2002) reported VGCF produced on graphite foil by sputter coating with stainless steel (Fe:Cr:Ni—70:19:11) followed by hydrogen reduction at 660 C. VGCF were subsequently produced at 0.3 torr pressure using an acetylene/nitrogen mixture. Significantly, they reported that for a pure iron or nickel catalyst on graphite no VGCF were formed. Thostenson et al. (2002) used identical process conditions as Wang et al. (2002) for growth of VGCF on a carbon fiber. They reported a nanofiber growth layer region between 200-500 nm in thickness.

U.S. Pat. Nos. 5,165,909 and 6,235,674 to Tennent et al., discuss the possibility of producing carbon fibrils, fibril mats, furry fibers, furry plates, and branched fibrils by deposition of a metal-containing particle on the surface of a carbon or alumina fiber, plate, or fibril and subsequent chemical vapor catalytic growth of carbon fibrils on the substrate at temperatures in the range of 850° C. to 1200° C. This example requires deposition of a preformed catalyst particle onto a carbon substrate and furthermore no working examples were provided other than branched fibrils. However, the approach Tennent et al., was very limited because it requires a separate process to form catalytic particles and disperse them. Such dispersion is not possible with a multi-filament yarn of continuous macroscopic fiber or a woven or braided preform manufactured from a multi-filament yarn.

In all these cases no discussion or method exists for the production of VGCNT on continuous carbon fiber yarns and preforms both mono- and multi-filament with sufficient yield in an industrially practical process. Thostenson et al. (2002) is the only literature report of VGCF growth on a carbon fiber, but in that case they used a stainless steel sputter coated fiber and specifically mentioned that catalyst could only be deposited on the outermost surfaces of a fiber bundle, not the interior fibers—and the process required a lengthy hydrogen reduction step to form catalytic particles. Further, VGCF growth was performed under high vacuum. None of these process steps are amenable to practical, scalable, manufacturing of nanofiber reinforced preforms.

U.S. patent application Ser. No. 11/057,462 (now U.S. Pat. No. 7,338,684, hereby incorporated in its entirety for all purposes) describes the fabrication of continuous preform having in situ grown VGCF. However, while the '462 application describes the benefits of in situ growth of VGCF on continuous fibers, the methods provided are limited to "batchwise" processing. The current invention provides for the in situ growth of VGCNT on continuous fiber preforms and continuous processing of the continuous fiber such that the time, type of fiber and characteristics of the VGCNT can be tailored to the demands of the preform or ultimate composite made therefrom. This eliminates the processing steps for isolated carbon nanotubes reported in other carbon nanotube composite approaches and therefore greatly reduces risk of environmental release and exposure to carbon nanotubes. A further limitation of the art is that to be usable, the VGCNT laden preforms need to be made in large volumes such that there use is not limited to short pieces or sections able to fit in a single reaction vessel.

SUMMARY OF THE INVENTION

The present invention provides a continuous process for the fabrication of vapor grown carbon nanotubes on a continuous preform. The continuous preform thus made according to the invention, is not limited in size or length and its progress through and exit from the growth furnace can be controlled. The continuous preform thus fabricated with VGCNT grown in situ demonstrate improved stiffness, strength, fracture toughness, and tailorable electrical and thermal properties in composite articles manufactured therefrom. It will be appreciated by those of skill, that the preforms thus made are essentially endless, not being limited in their capacity to be formed into composites by length or size. In another aspect, the present invention provides a continuous method for manufacturing in situ of a vapor grown carbon nanotube reinforced composite preform useful in many industrial applications. In yet another aspect, the present invention provides a method for the manufacture of composite articles from these continuously grown VGCNT reinforced composite preforms. Thus, the present invention provides a continuous process for growing VGCNT in situ in a continuous preform at treatment periods and growth times that are tailored to each specific substrate or preform type and for the growth of VGCNT having desired characteristics.

Therefore, in one exemplary embodiment, the invention comprises a continuous process for producing a carbon nanotube reinforced continuous fiber preform useful in the manufacture of carbon reinforced composite articles. This exemplary embodiment comprises the steps of: (a) dispersing a catalyst precursor throughout a continuous fiber preform; (b) converting the catalyst precursor into catalytic particles, the catalytic particles dispersed throughout the continuous fiber preform; (c) contacting the continuous fiber preform containing the catalytic particles with a hydrocarbon precursor gas; and (d) continually moving the treated preform through a growth furnace. Using this process vapor grown carbon nanotubes are formed in situ at the catalytic particles dispersed throughout the continuous fiber preform to yield a carbon nanotube reinforced continuous fiber preform.

In various exemplary embodiments according to the invention, the catalyst precursor comprises iron, nickel, cobalt, copper, chromium, molybdenum, or a mixture thereof or any usable salt thereof. Of course it should be appreciated that the invention is not limited to the particular catalysts recited above, as any catalyst suitable for VGCNT is encompassed by the invention. In some exemplary embodiments, the solvent for the catalyst precursor is alcohol, acetone, ethanol, isopropanol, hexane, methanol, water or any other suitable solvent usable for the catalyst precursor. In some exemplary embodiments, the catalyst precursor is a salt. Further, it should be appreciated that in some instances, the solvent will be a mixture of any of the foregoing. In still other exemplary embodiments, the catalyst precursor is iron acetate, iron nitrate, iron oxalate, nickel acetate, nickel nitrate, nickel oxalate, cobalt acetate, cobalt nitrate, cobalt oxalate, or a mixture thereof. Those of skill in the art however, will recognize that any other catalyst precursor suitable for growing VGCNT will do.

In various exemplary embodiments, the continuous fiber preform includes a carbon preform, ceramic preform, glass preform, quartz preform, a graphite preform, a metal preform or combinations thereof. For example, it will be appreciated by those of skill in the art, that a preform of one type may be joined to a preform of another type for use in the continuous process disclosed herein. In some exemplary embodiments, the continuous fiber is a multi-filament fiber. In this embodiment, the multi filament fiber may include a yarn, a weave, a braid or a tow. Of course, it should be appreciated that the multifilament fiber according to the invention may be combinations of the above such that the continuous fiber is joined to another continuous fiber of the same or different type as desired.

In various other exemplary embodiments, the invention includes pyrolysis of the catalyst treated preform in a pyrolysis furnace. Those of skill in the art will appreciate that pyrolysis of the catalyst precursor treated preform burns off organic material in the continuous fiber preform and converts the catalyst precursor molecules to catalytic particles. In some exemplary embodiments according to the invention, the process of pyrolyzing the continuous preform is a continuous process. In this exemplary embodiment, the process includes a pyrolysis furnace adapted for the continuous deployment of the continuous fiber preform through the pyrolysis furnace. In various exemplary embodiments according to the invention, the pyrolysis furnace is provided with a mechanism for continuously loading the continuous fiber preform into an inlet of the pyrolysis furnace and continuously taking-up the continuous fiber at an outlet of the pyrolysis furnace. In this embodiment the rate of loading and of taking up is approximately equal such that the continuous fiber preform moves through the furnace at a predetermined, rate. Of course, it should be appreciated that the rate of transit through the pyrolysis furnace can vary depending on the temperature, volume of the furnace, composition of the preform etc.

In various exemplary embodiments, the pyrolysis of the continuous fiber preform takes place at between about 300° C. and 900° C. In some exemplary embodiments, the pyrolysis of the continuous fiber preform takes place at between about 500° C. to about 600° C. In various exemplary embodiments, the pyrolysis of the preform takes from between one second to over thirty minutes. Those of skill in the art will appreciate that the time for pyrolysis is a function of the temperature at which the pyrolysis takes place and the residence time in the furnace. If the pyrolysis furnace is hotter pyrolysis will take less time. In various exemplary embodiments, the pyrolysis takes place at from about one minute to about 15 minutes.

In various exemplary embodiments, the process according to the invention further includes feeding the pyrolyzed continuous preform into the front-end of a growth furnace with a precursor gas to induce growth of carbon nanotubes. In some exemplary embodiments according to the invention, the fed-in preform is taken-up at the rear-end of the growth furnace. In various exemplary embodiments, the growth furnace includes a mechanism at the front-end and the rear-end such that the continuous fiber preform moves at a continuous, predetermined rate through the growth furnace. In various exemplary embodiments, the time of passage through the growth furnace is from 1 minute to 1,000 minutes. In some exemplary embodiments, the residence time in the growth furnace is from about 10 minutes to about 100 minutes. However, those of skill in the art will appreciate that the residence time in the furnace is a factor of the temperature of the furnace, the length of the furnace and the length of the preform. Thus, while in some exemplary embodiments, the temperature of the growth furnace is about from between approximately 700° C. to about 950° C., in other exemplary embodiments the nanotube growth step occurs at a temperature of about 750° C. to about 850° C.

In various exemplary embodiments, the hydrocarbon precursor gas is acetylene, methane, propane, ethylene, benzene, natural gas or mixtures thereof. Of course it should be appreciated that any suitable hydrocarbon precursor gas is encompassed by the invention. In some exemplary embodiments, the hydrocarbon precursor gas is provided in a reactive gas composition comprising about approximately 0.1% to 10% hydrocarbon precursor gas in 99.9% to 90% inert gas. In various exemplary embodiments, the precursor gas is provided in a reactive gas composition comprising about approximately 0.5% to 2% hydrocarbon precursor gas in 99.5% to 98% inert gas. In some exemplary embodiments, the precursor gas is provided in a reactive gas composition comprising about approximately 1% hydrocarbon precursor gas in 99% inert gas. In some exemplary embodiments, the reactive gas composition is 1% acetylene in nitrogen. In various embodiments, the flow velocity in the furnace is approximately about 10 to 1000 cm/min. In still other exemplary embodiments, flow velocity in the furnace is approximately about 10 to 100 cm/min. Of course, those of skill in the art will appreciate that the velocity of flow in the furnace will be a function of the size of the furnace and the length of the furnace, e.g., volume. Thus, the residence time of the continuous fiber preform in the furnace will be a function of many factors each optimized for the particular fiber, furnace gas mixture etc. used.

In various other exemplary embodiments, the continuous fiber preform has a heat treatment step before the growth step. In this exemplary embodiment, the heat treatment step occurs at a temperature of about approximately 600° C. to about 900° C. In some exemplary embodiments, the heat treatment step occurs at a temperature of about 800° C. In various exemplary embodiments, the heat treatment step occurs in an inert atmosphere.

In various exemplary embodiments, the heat treatment step occurs sequentially before the growth step. In some exemplary embodiments, the heat treatment step and the growth step take place in the same furnace. In these exemplary embodiments, the furnace is a two-zone furnace such that the continuous fiber preform moves from the heat treatment zone to the growth zone without exiting the furnace. In some exemplary embodiments, the inert gas (or purge gas) is added to the furnace at the inlet and the hydrocarbon precursor gas is injected into the furnace before the growth zone. In other exemplary embodiments, the purge gas is added to the furnace at the inlet and the hydrocarbon precursor gas is entered to the furnace via a second inlet, prior to the heat treatment zone. In this embodiment, the hydrocarbon precursor gas is mixed with the purge gas prior to the growth zone. In various exemplary embodiments, the continuous fiber preform is continuously moved through the furnace at a predetermined rate. In some exemplary embodiments, the furnace includes a mechanism at the inlet and the outlet such that the continuous fiber preform is belayed into the furnace and taken-up at the furnace outlet and approximately equal rates, such that the continuous fiber preform continuously moves through the heat treatment zone and the growth zone allowing for the continuous growth of VGCNT along the length of the continuous fiber preform. Of course, those of skill in the art will recognize that the rate of movement of the continuous fiber preform through the furnace can be slower or faster, the rate of gas flow and temperature adjusted thereto depending on the VGCNT growth desired, the specific hydrocarbon precursor used and the length of the furnace, or the specific type of continuous preform used, to name a few of the variables. Further, it should be appreciated that more than one continuous fiber preform can be processed at one time. Further, according to some embodiments, the continuous fiber preforms of the same type or of a different type are treated with the catalyst precursor in tandem, pyrolyzed and fed into the growth furnace. In other embodiments, one or more continuous fiber preforms have already been treated and have been stored for later use. These preforms may then be fed into the growth furnace together to allow for VGCNT growth on more than one preform during the growth phase.

Thus, it should be appreciated that using the disclosed methods, any of these parameters can be changed as desired. For example, the reactive gas composition, preform type, residence time etc. can be altered as the preform moves through the furnace as desired.

In various other exemplary embodiments, the invention includes a process of fabricating a carbon nanotube reinforced composite article using the foregoing process and further infusing the carbon reinforced continuous fiber preform with a thermoplastic or thermoset polymer resin, metal, ceramic, ceramic precursor, or amorphous glass to provide a carbon nanotube reinforced composite article.

In still other exemplary embodiments the invention includes a continuous fiber preform made by a continuous process as described above. The inventors have found that the VGCNT fibers formed by the instantly disclosed process are denser, more uniform, well dispersed and in intimate contact, and provide more structural support and electrical conductivity because they are grown in situ.

In yet other exemplary embodiments, the invention includes a carbon nanotube reinforced composite article produced from the infusing the continuous fiber preform disclosed herein using a desired resin or matrix.

Other objects, features and advantages of the present invention will become apparent after review of the detailed description, figures and appended claims.

BRIEF DESCRIPTION OF THE DRAWINGS

FIG. 6 is a diagrammatic representation of the first step in the process for the fabrication of a continuous preform in one embodiment according to the invention. Step 1, is the preform catalyst solution treatment process. This in general involves solution coating and drying the preform.

FIG. 7 is a diagrammatic representation of the second step in the process for the fabrication of a continuous preform in one embodiment according to the invention. Step 2, is the preform catalyst pyrolysis process. This in general involves heating the dried preform in an inert atmosphere to pyrolyze the organic content of sizings and to convert the catalyst precursor to catalytic particles.

FIGS. 10A and 10B are electron micrographs of carbon nanotubes (VGCNT) grown on silicon carbide (SiC) fibers (Nicalon™, Nippon Chemical LTD, Japan) fiber. FIG. 10A, shown at about 620×, a segment of the SiC fiber yarn with 14 minutes of heat treatment and 42 minutes of growth. FIG. 10B, shown at about 540×, segment of the SiC fiber yarn with 6 minutes of heat treatment and 50 minutes of growth.

FIGS. 11A and 11B are electron micrographs of CNT grown on un-sized Hexcel Corporation AU4-12k carbon fiber yarn. FIG. 11A, shown at about 870×, shows a segment of yarn 45 cm from the leading edge of the catalyst treated continuous yarn corresponding to a heat treatment time of 14 minutes and a growth time of 42 minutes. FIG. 11B, shown at about 650×, shows a segment of yarn 51 cm from the leading edge corresponding to a heat treatment time of 10 minutes and a growth time of 46 minutes.

FIG. 12, shown at 160× magnification is an electron micrograph showing CNT Carbon nanotube growth on a segment of SiC (Hi-Nicalon™) fiber yarn from approximately the middle of the 30 m length of yarn.

FIGS. 13A and 13B are scanning electron micrographs of carbon nanotube growth on a 15 cm piece of ceramic grade SiC fiber yarn (Nicalon™ CG) demonstrating lower electrical resistivity. FIGS. 13A and B are the same preparation, at 350×SEM, and 1300× magnification respectively.

FIG. 16A shows a segment of the preparation at 950× magnification. FIG. 16B, the same preparation at a 2,400× magnification.

FIG. 17A is an electron micrograph of carbon nanotubes on SiC (Nicalon™) yarn at a 30× magnification. FIG. 17B shows the same preparation at 1410× magnification.

FIG. 18A shows a segment of the SiC with 92 minutes of growth at 540× magnification. FIG. 18B shows the same preparation at 750× magnification.

DETAILED DESCRIPTION OF THE INVENTION

I. In General

Figure 1A:
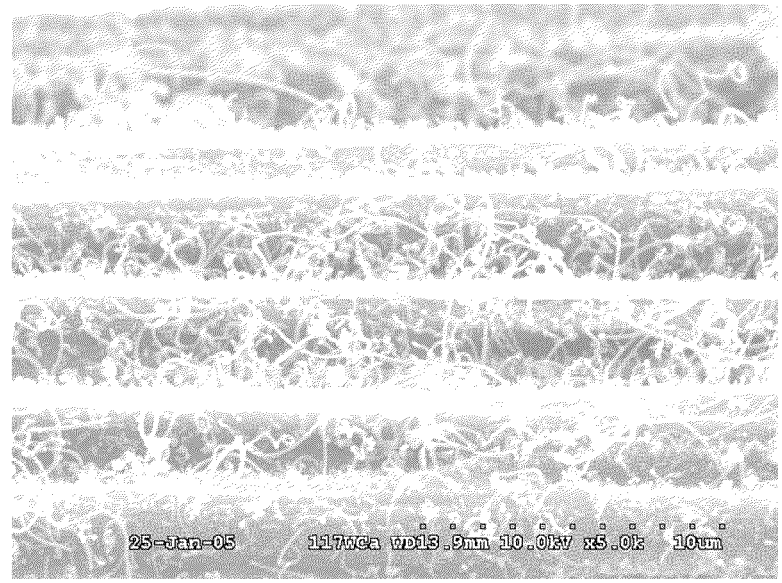
FIG. 1A is an SEM image of carbon preform sample from EXAMPLE 1 (approx. 3950× magnification).

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

Unless defined otherwise, all technical and scientific terms used herein have the same meanings as commonly understood by one of ordinary skill in the art to which this invention belongs. All publications and patents specifically mentioned herein are incorporated by reference for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention. It should be appreciated that the term "preform" according to the invention is the "substrate" for the VGCNT grown in situ thereon. Further, as used herein the terms "hydrocarbon precursor gas" and "feed gas" are used interchangeably and are equivalents. Further, it should be appreciated that, as used herein, the term "endless" refers to the ability to bond, braid, weave or combine in any like manner multiple continuous carbon fiber yarns sequentially, in parallel or any other manner such that the length or area is essentially infinite or endless. As used herein the term "reactive gas composition" refers the gas mixture in the growth chamber. Thus, the reactive gas composition refers to the hydrocarbon precursor gas in addition to the carrier or "purge" or inert gas. As is described below, in some instance, the reactive gas composition is premixed before being fed into the furnace in other embodiments the reactive gas composition is mixed within the furnace.

The invention and the various features and advantageous details thereof are explained more fully with reference to the non-limiting embodiments that are illustrated in the accompanying drawings and detailed in the following description. Descriptions of well known components and processing techniques are omitted so as not to unnecessarily obscure the invention in detail but such descriptions are, nonetheless, included in disclosure by incorporation by reference of the citations following the Examples section. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this detailed description.

II. The Invention

In one aspect, the present invention provides a continuous process for the fabrication of vapor grown carbon fibers on a continuous preform. The continuous preform thus fabricated with VGCNT grown in situ demonstrates improved stiffness, strength, fracture toughness, and tailorable electrical and thermal properties in composite articles manufactured therefrom. In another aspect, the present invention provides a continuous method for manufacturing in situ of a vapor grown carbon nanotube reinforced composite preform useful in many industrial applications. Such applications include, but are not limited to, electrodes, intelligent textiles, electromagnetic signature control, electromagnetic interference (EMI) shielding, carbon-carbon precursor material, filtration and separation, thermal management materials, ceramic composite materials, gas adsorption and solid state storage, cell growth and tissue regeneration. In yet another aspect, the present invention provides a method for the manufacture of composite articles from these continuously grown VGCNT reinforced composite preforms. Thus, the present invention provides a continuous process for growing VGCNT in situ in a continuous preform at treatment periods and growth times that are tailored to each specific substrate or preform type and for the growth of VGCNT having desired characteristics.

Therefore, in one exemplary embodiment, the invention comprises a continuous process for producing a carbon nanotube reinforced continuous fiber preform useful in the manufacture of carbon reinforced composite articles. This exemplary embodiment comprises the steps of: (a) dispersing a catalyst precursor throughout a continuous fiber preform; (b) converting the catalyst precursor into catalytic particles, the catalytic particles dispersed throughout the continuous fiber preform; (c) contacting the continuous fiber preform containing the catalytic particles with a hydrocarbon precursor gas; and (d) continually moving the treated preform through a growth furnace. Using this process vapor grown carbon nanotubes are formed in situ at the catalytic particles dispersed throughout the continuous fiber preform to yield a carbon nanotube reinforced continuous fiber preform.

In various exemplary embodiments according to the invention, the catalyst precursor comprises iron, nickel, cobalt, copper, chromium, molybdenum, or a mixture thereof or any usable salt thereof. Of course it should be appreciated that the invention is not limited to the particular catalysts recited above, as any catalyst suitable for VGCNT is encompassed by the invention. In some exemplary embodiments, the solvent for the catalyst precursor is alcohol, acetone, ethanol, isopropanol, hexane, methanol, water or any other suitable catalyst usable for the catalyst precursor. In some exemplary embodiments, the catalyst precursor is a salt. Further, it should be appreciated that in some instances, the solvent will be a mixture of any of the foregoing. In still other exemplary embodiments, the catalyst precursor is iron acetate, iron nitrate, iron oxalate, nickel acetate, nickel nitrate, nickel oxalate, cobalt acetate, cobalt nitrate, cobalt oxalate, or a mixture thereof. Those of skill in the art however, will recognize that any other catalyst precursor suitable for growing VGCNT will do.

In various exemplary embodiments, the continuous fiber preform includes a carbon preform, ceramic preform, glass preform, quartz preform, a graphite preform, a metal preform or combinations thereof. For example, it will be appreciated by those of skill in the art, that a preform of one type may be joined to a preform of another type for use in the continuous process disclosed herein. In some exemplary embodiments, the continuous fiber is a multi-filament fiber. In this embodiment, the multi-filament fiber may include a yarn, a weave, a braid or a tow. Of course it should be appreciated that the multi-filament fiber according to the invention may be combinations of the above such that the continuous fiber is joined to another continuous fiber of the same or different type as desired. Further, as disclosed herein, in various exemplary embodiments, more than one continuous fiber can be treated at one time. Thus, according to some embodiments, the continuous fiber preforms of the same type or of a different type are treated with the catalyst precursor in tandem, pyrolyzed and fed into the growth furnace. In other embodiments, one or more continuous fiber preforms have already been treated and have been stored for later use. These preforms may then be fed into the growth furnace together to allow for VGCNT growth on more than one preform during the growth phase.

In various other exemplary embodiments, the invention includes pyrolysis of the catalyst treated preform in a pyrolysis furnace. Those of skill in the art will appreciate that pyrolysis of the catalyst precursor treated preform burns off organic material in the continuous fiber preform and converts the catalyst precursor molecules to catalytic particles. In some exemplary embodiments according to the invention, the process of pyrolyzing the continuous preform is a continuous process. In this exemplary embodiment, the process includes a pyrolysis furnace adapted for the continuous deployment of the continuous fiber preform through the pyrolysis furnace. In various exemplary embodiments according to the invention, the pyrolysis furnace is provided with a mechanism for continuously loading the continuous fiber preform into an inlet of the pyrolysis furnace and continuously taking-up the continuous fiber at an outlet of the pyrolysis furnace. In this embodiment the rate of loading and of taking up is approximately equal such that the continuous fiber preform moves through the furnace at a predetermined, rate. Of course, it should be appreciated that the rate of transit through the pyrolysis furnace can vary depending on the temperature, volume of the furnace, composition of the preform etc.

In various exemplary embodiments, the pyrolysis of the continuous fiber preform takes place at between about 300° C. and 900° C. In some exemplary embodiments, the pyrolysis of the continuous fiber preform takes place at between about 500° C. to about 600° C. In various exemplary embodiments, the pyrolysis of the preform takes from between one second to over thirty minutes. Those of skill in the art will appreciate that the time for pyrolysis is a function of the temperature at which the pyrolysis takes place and the residence time in the furnace. If the pyrolysis furnace is hotter pyrolysis will take less time. In various exemplary embodiments, the pyrolysis takes place at from about one minute to about 15 minutes.

In various exemplary embodiments, the process according to the invention further includes feeding the pyrolyzed preform into the front-end of a growth furnace with a precursor gas to induce growth of carbon nanotubes. In some exemplary embodiments according to the invention, the fed-in preform is taken-up at the rear-end of the growth furnace. In various exemplary embodiments, the growth furnace includes a mechanism at the front-end and the rear-end such that the continuous fiber preform moves at a continuous, predetermined rate through the growth furnace. In various exemplary embodiments, the time of passage through the growth furnace is from 1 minute to 1,000 minutes. In some exemplary embodiments, the residence time in the growth furnace is from about 10 minutes to about 100 minutes. However, those of skill in the art will appreciate that the residence time in the furnace is a factor of the temperature of the furnace, the length of the furnace and the length of the preform. Thus, while in some exemplary embodiments, the temperature of the growth furnace is about from between approximately 700° C. to about 950° C., in other exemplary embodiments the nanotube growth step occurs at a temperature of about 750° C. to about 850° C.

In various exemplary embodiments, the hydrocarbon precursor gas is acetylene, methane, propane, ethylene, benzene, natural gas or mixtures thereof. Of course it should be appreciated that any suitable hydrocarbon precursor gas is encompassed by the invention. In some exemplary embodiments, the hydrocarbon precursor gas is provided in a reactive gas composition comprising about approximately 0.1% to 10% hydrocarbon precursor gas in 99.9% to 90% inert gas. In various exemplary embodiments, the precursor gas is provided in a reactive gas composition comprising about approximately 0.5% to 2% hydrocarbon precursor gas in 99.5% to 98% inert gas. In some exemplary embodiments, the precursor gas is provided in a reactive gas composition comprising about approximately 1% hydrocarbon precursor gas in 99% inert gas. In some exemplary embodiments, the reactive gas composition is 1% acetylene in nitrogen. In various embodiments, the flow velocity in the furnace is approximately about 10 to 1000 cm/min. In still other exemplary embodiments, flow velocity in the furnace is approximately about 10 to 100 cm/min. Of course, those of skill in the art will appreciate that the velocity of flow in the furnace will be a function of the size of the furnace and the length of the furnace, e.g., volume. Thus, the residence time of the continuous fiber preform in the furnace will be a function of many factors each optimized for the particular fiber, furnace gas mixture etc., used In various other exemplary embodiments, the continuous fiber preform has a heat treatment step before the growth step. In this exemplary embodiment, the heat treatment step occurs at a temperature of about approximately 600° C. to about 900° C. In some exemplary embodiments, the heat treatment step occurs at a temperature of about 800° C. In various exemplary embodiments, the heat treatment step occurs in an inert atmosphere.

In various exemplary embodiments, the heat treatment step occurs sequentially before the growth step. In some exemplary embodiments, the heat treatment step and the growth step take place in the same furnace. In these exemplary embodiments, the furnace is a two-zone furnace such that the continuous fiber preform moves from the heat treatment zone to the growth zone without exiting the furnace. In some exemplary embodiments, the inert gas (or purge gas) is added to the furnace at the inlet and the hydrocarbon precursor gas is injected into the furnace before the growth zone. In other exemplary embodiments, the purge gas is added to the furnace at the inlet and the hydrocarbon precursor gas is entered to the furnace via a second inlet, prior to the growth zone. In this embodiment, the hydrocarbon precursor gas is mixed with the purge gas prior to the growth zone. In various exemplary embodiments, the continuous fiber preform is continuously moved through the furnace at a predetermined rate. In some exemplary embodiments, the furnace includes a mechanism at the inlet and the outlet such that the continuous fiber preform is belayed into the furnace and taken-up at the furnace outlet and approximately equal rates, such that the continuous fiber preform continuously moves through the heat treatment zone and the growth zone allowing for the continuous growth of VGCNT along the length of the continuous fiber preform. Of course, those of skill in the art will recognize that the rate of movement of the continuous fiber preform through the furnace can be slower or faster, the rate of gas flow and temperature adjusted thereto depending on the desires, the specific hydrocarbon precursor used and the length of the furnace, or the specific type of continuous preform used, to name a few of the variables.

Thus, it should be appreciated that using the disclosed methods, any of these parameters can be changed as desired. For example, the reactive gas composition, preform type, residence time etc. can be altered as the preform moves through the furnace as desired.

In various other exemplary embodiments, the invention includes a process of fabricating a carbon nanotube reinforced composite article using the foregoing process and further infusing the carbon nanotube reinforced continuous fiber preform with a thermoplastic or thermoset polymer resin, metal, ceramic, ceramic precursor, or amorphous glass to provide a carbon reinforced composite article.

In still other exemplary embodiments the invention includes a continuous fiber preform made by a continuous process as described above. The inventors have found that the VGCNT fibers formed by the instantly disclosed process are denser, more uniform and provide more structural support and electrical conductivity because they are grown in situ.

In yet other exemplary embodiments, the invention includes a carbon nanotube reinforced composite article produced from the infusing the continuous fiber preform disclosed herein using a desired resin or matrix.

In yet other exemplary embodiments, the invention includes a carbon nanotube reinforced composite article produced from the infusing the continuous fiber preform disclosed herein.

Many methods are available for the synthesis of carbon nanotubes (CNT) such as arc-discharge method, laser ablation method and chemical vapor deposition (CVD). Amongst these methods, CVD is the most promising method as the percentage of yield is much higher and is relatively easy to set-up. This process has the potential to be scaled up for bulk and continuous production.

The basic principle of growth in CVD can be explained as follows. When metal suitable catalysts are saturated with carbon precursors at high temperatures, CNT are formed. The heated feed gas decomposes into hydrogen and carbon, with the carbon depositing on the catalyst particle forming carbon nanotubes. The diameter, morphology and length of the nanotubes are controlled by varying the metal catalyst, precursor gases, temperature, reaction time and substrate (where applicable). In a typical CVD synthesis setup, a certain amount of catalyst powder/substrate is placed in a quartz reactor tube and subjected to growth conditions. Generally, a carrier gas which is an inert gas such as nitrogen, argon or helium is used (higher flow rate as compared to precursor gas) along with the carbon feed gas to transport the carbon precursor gas to the catalyst. The most obvious disadvantage of CVD is the production of pyrolytic/amorphous carbon along with CNT. While a thin layer of amorphous carbon on the CNT can be advantageous in certain applications, a very thick layer of amorphous carbon covering all the tubes and substrate is certainly detrimental. If the growth parameters are not controlled carefully, often only amorphous carbon is deposited. The following table gives the conventional gases and temperature ranges used for synthesizing each type of nanotube.

| Type of Carbon Nanotube (CNT) | Precursor Gas | Temperature Range |
| --- | --- | --- |
| Single Wall Carbon NanoTubes (SWCNT) | Methane | Greater than 900° C. |
| Multi Wall Carbon NanoTubes (MWCNT) | Acetylene, Ethylene | Around 750° C. |
| Carbon Nanofibers (CNF) | Acetylene, Ethylene - preferably in a plasma discharge chamber. | Between 400 and 700° C. |

The growth of SWCNT requires greater control of growth conditions as compared to the growth of MWCNT and CNF. Many research groups have grown MWCNT on silica and silicon substrates, glass, graphite flakes etc. Therefore, the inventors have focused their attention on the growth of a dense crop of CNT on continuous fiber preforms to yield essentially endless CNT preforms which can be used to manufacture novel articles and continuous fiber reinforced composites Traditionally, CVD has been used to grow CNT on some substrate or for bulk growth of CNT using some supported catalyst powder. The CNT are then harvested for use. The present invention provides VGCNT grown in situ on the preform substrate, a use for which the bulk catalyst method is not amenable. In the bulk synthesis methods, a "floating catalyst" method is used wherein unsupported catalytic particles float in a fluidized reactor from which CNTs grow, or metal catalyst is supported by some substrate which is in the form of fine powder and after the growth; the substrate is separated to provide free CNT or MWCNT for incorporation in polymeric materials.

It should be noted that this is an emerging field. Therefore, as research into the production and incorporation of CNT evolves more variables, including substrates and production variables are recognized. Currently, there are several recognized variables involved in the synthesis of CNT and new variables arise, depending on the experimental setup used. Several theories have been postulated on the growth of CNT and there are two theories that are widely acceptable. The growth of CNT from a metal catalyst can either be because of tip growth or base growth. In tip growth, the catalyst particle stays on top of the CNT and the carbon deposition takes by passing through the catalyst particle; whereas in base growth, the catalyst particle adheres to the substrate and the growth of fiber takes place on the particle. The growth mechanism therefore depends on the interaction between the catalyst particle and the substrate; if the catalyst and substrate adhere weakly, it is likely that the growth takes place via tip growth or it is base growth if the interaction is strong.

The growth of CNT and also their morphology is primarily dependent on the following factors: (1) Substrate; (2) Catalyst—type of catalyst, size of catalyst particle, amount of catalyst, method of application of catalyst and pretreatment of catalyst; (3) Growth temperature; (4) Pressure in the growth chamber; (5) Carbon precursor gas—type of gas and flow rate; (6) Duration of growth; and (7) Miscellaneous.

Substrate

Many groups have grown CNT on substrates, generally on silica, zeolite and graphite flakes. It has been concluded that graphite is not a very good substrate for the growth of CNT using common catalyst application techniques such as impregnation and ion-exchange. It was found that for a graphite supported catalyst the number of catalyst particles encapsulated in amorphous carbon was higher as compared to a silica gel supported catalyst. It was found that the growth on other substrates was much better in terms of yield; this was attributed to the weak interface between the catalyst particle and graphite. Hence there are no papers that discuss the growth of CNT on graphite substrate (applying catalyst by impregnation etc.) by varying the above mentioned parameters. In the recent past, CNT have been grown on carbon fibers and textiles by sputter coating them with stainless steel and carrying on the growth process.

Catalyst

Type of Catalyst: Typically, transition metal elements such as Fe, Co, Ni, Cu, or alloys of these elements are used as catalysts for the growth of CNT. It is believed that the elements in their metallic form nucleate the growth of CNT during CVD. In few experiments, researchers have found that the metallic elements are completely replaced by some form of carbon after growth.

Method of application of catalyst: The catalyst can be applied directly in the metallic state by sputter coating the substrate with a thin film of metal or it can be used in the form of metal salt solution. The later method is widely used and catalyst in the form of aqueous/alcoholic solutions of Iron(III) Nitrate, Iron (III) Acetate, Iron(III) Oxalate, Nickel (II) Acetate, Co(II) Acetate, Co(II) Nitrate etc. are applied through impregnation or ion-exchange. It has been found that Cobalt and Iron catalyze the formation of well defined hollow structures, whereas on Nickel and Copper fragments of turbostratic graphite are formed.

It should be noted that, each method of application further presents various variables and drawbacks depending on the desired use. For example, the impregnation method, the substrate powder of substrate is soaked in the catalyst solution for certain time, typically 30 minutes-1 hour (longer soaking time is required, if the substrate is a porous). Then, the substrate is dried at 70° C.-80° C. for substantial time to ensure that the solvent is completely evaporated. Increasing the drying temperature may lead to agglomeration of catalyst particles which would effect the growth of CNT adversely. Ion exchange method has typically been used with powdered substrates for bulk synthesis. In this method, the substrate powder is soaked in catalyst solution for 1-3 days and the pH of the solution is adjusted to be in between 7-9 so that it facilitates optimal deposition of catalyst ions on the substrate.

Amount of catalyst and concentration of catalyst: The amount of catalyst (i.e. supported catalyst powder or the size of substrate impregnated with catalyst solution) governs the flow rate of feed gas; greater amounts and bigger substrates needing higher flow rates of precursor gas. Also, the concentration of catalyst governs the growth of CNT. Generally, 2.5-10% by weight metal in substrate is used for bulk synthesis. The concentration of catalyst influences the density of CNT formed. However, if the concentration of catalyst is too high, it leads to the formation of amorphous carbon. This could be because of clusters of metal particles that form at high temperatures, which are not capable of producing CNT.

Size of catalyst particle: It is currently thought that the size of catalyst particle governs the diameter of the nanotube, and that the catalyst particle must fall within a narrow size range for optimal activity. However, exemplifying the state of the art, a consensus on whether the size of the particle controls the ID or OD of the tube has not been made. Commonly, it is believed that the catalyst particle size controls the inner diameter of the tube and the outer diameter is controlled by the number of layers and thickness of pyrolytic carbon, which is dependent on how long the catalyst particle is active (as long as it is not completely covered with carbon). From previous results obtained by various authors, when catalyst salt solution is used, the average OD of the CNT on a graphite of silica substrate is around 100 nm.

Pre-treatment of catalyst: After the catalyst is applied to the substrate (either metallic form or a metal salt solution), it is subjected to conditions that activate the catalyst particles. Typically calcination in air or nitrogen at 500° C., reduction in hydrogen at 600° C. for varying durations is used. Calcination decomposes the metal salt to its constituents so that, additional groups (e.g. nitrate group in ferric nitrate) are lost from the substrate. Depending on the calcination temperature and atmosphere, the remaining metal ion stays in the ionic form or reacts with oxygen to form some oxide. However, some researchers have postulated that FeO (an oxide that can be formed by treating iron with water vapor or wet nitrogen; it does not form directly on heating iron in air) has greater catalytic activity than metallic iron.

Growth Temperature: The growth temperature needed for the growth of CNT is usually in the range of 700-800° C. As mentioned earlier, the growth of CNT is always accompanied by the formation of amorphous carbon. There is a trade-off between the quality of CNT and quantity of pure CNT. At lower temperatures, around 650° C., there is no amorphous carbon formed, but the graphitization of the walls is not complete. The crystalline graphite structure of the walls is not well-defined and these CNT have poor quality. As the growth temperature is increased, the walls are more turbostratic in nature and the structure of each wall is well-defined; but, the amount of amorphous carbon also increases. The temperature thus governs the diameter of the nanotube, because it governs the thickness of pyrolytic carbon deposited on their surface. The growth temperature does not directly govern the length of the nanotubes, but controls the activity of the catalyst particle. The catalyst particle remains active as long as it is not enclosed by amorphous carbon, this in turn depends on the growth temperature and composition of the reactive gas mixture (i.e. concentration of the hydrocarbon gas in the inert gas carrier).

Growth Pressure: Generally, in cases when a metal is sputter coated on some substrate, the pressure in the reaction tube is below atmospheric pressure (in the range of few torr) and methods that use metal salt solutions are carried out at atmospheric pressure. Not many studies have been conducted on the effect of pressure on the growth of CNT. However, Ren et al. have reported that the CNT yield increases as the pressure increases from 0.6 torr to 600 torr and then decreases as the pressure approaches atmospheric pressure. However, graphitization of the walls is better at 760 torr. As the pressure increases, the CNT get thicker by increasing the number of graphene layers.

Carbon Precursor Gas: The amount of hydrocarbon needed in the reaction depends on the amount of substrate/catalyst powder present or the size of the substrate. For a bigger substrate, a higher flow rate of gas is required. For a given amount of catalyst, as the flow rate of hydrocarbon gas increases, the amount of amorphous carbon formed also increases. There are, as yet, no equations that govern the relation between the amount of catalyst and required flow rate for optimal growth of CNT; each process will require its own conditions and in traditional methods of VGCNT growth fabrication, the variables cannot be "tuned" as is provided by the present invention. Acetylene has, so far, been found to have the highest activity amongst hydrocarbons in the formation of CNT. However, other gases such as ethylene, propylene, benzene and natural gas, have been found to be usable.

Duration of growth: The duration basically governs the length of the CNT. It has been observed that there is formation of CNT even during the first one minute of growth and as the duration increases, the length of CNT continues to increase as long as the catalyst particle is not deactivated (i.e., covered with amorphous carbon). It was observed that a negligible amount of amorphous carbon is formed during the first 30 minutes of growth. As the duration increase beyond 1 hour, the amount of amorphous carbon progressively increases. It has also been observed that the longest tubes are often the thickest ones. Generally, reaction times ranging from 30 minutes to 3 hours have been used depending on the other growth parameters and experimental setup.

As a general rule, for the growth of CNT, the rates of dissolution, diffusion and precipitation of carbon atoms in the catalyst particles must match. At non-optimal conditions of temperature, flow rates, the concentration of carbon atoms is probably too high; the dissolving rate is higher than diffusion and precipitation rates, resulting in an accumulation of the carbon atoms on the top of the catalyst particles. The over-saturated catalyst particles will lose their catalytic activity in a short growth time and the yield of CNT is reduced.

Therefore, it should be appreciated that the ability to provide preforms that have an optimal density or the desired size and strength of CNT and that can be fabricated in a time efficient manner is a matter of optimizing many variables. Further, it should be appreciated that by "time efficient" the inventors mean, not only in an economic sense but, more importantly in the sense that each of the steps necessary takes place at an optimum time so as to produce the desired nanotube type on the desired preform structure. Rushing the process may lead to no CNT, reduced CNT or CNT with excessive amorphous carbon residue, for example. Similarly, delaying the process may, for example, result in a catalyst solution that does not have the desired reactivity and/or CNT of the inappropriate diameter.

The vapor grown carbon fibers are produced by contacting a hydrocarbon gas with a catalytic particle under appropriate reaction conditions and therefore this invention requires that the continuous fiber preform be subjected to a process that yields distributed catalytic particles within the preform. This can be accomplished by numerous methods. For example, the catalyst may be introduced into the preform by liquid or gas phase infusion of the preform with a suitable catalyst particle, or by infusion with a liquid or gas phase precursor solution that leads to the formation of the catalyst particle in situ. The continuous fiber preform may also be treated so that the catalyst is dispersed along and within the preform prior to manufacturing of a more complex preform. For example, a continuous yarn may be treated with catalyst solution and subsequently woven or braided into a more complex preform. In these manners, the metal catalyst particle or metal catalyst particle yielding solution is distributed uniformly throughout the preform.

Iron, nickel, cobalt, copper, chromium, or molybdenum catalytic particles and mixtures thereof are useful for dispersing on the continuous fiber preform to produce VGCNT when contacted with an appropriate hydrocarbon gas under the appropriate conditions. Iron, nickel, cobalt, copper, chromium, or molybdenum compounds, and mixtures thereof are useful in the form of precursor solutions for treating preforms. Non-limiting examples of such solutions include the acetates, nitrates, and oxalates of iron, nickel, and cobalt in solutions with water, alcohols, or mixtures thereof. Organo-metallic compounds with iron, nickel, or cobalt (such as ferrocene, nickelocene, and cobaltocene) and mixtures thereof will also be useful as catalyst precursor solutions. In general, the metal compound is dissolved in an appropriate solvent at the desired concentration, and then the preform is dipped, sprayed, or continuously passed through the solution followed by heating to remove the solvent. These non-limiting illustrations are methods of uniformly treating the preform with the catalyst precursor solution. Modifications to this process obvious to those skilled in the art are within the scope of this invention. For example, treatment of the preform with a sulfur bearing compound (e.g. thiophene) in addition to the catalyst may enhance the catalytic activity. Also, other additives may be used in the catalyst precursor solution to enhance wetting of the substrate by the solution (i.e. surfactants, wetting agents, soluble polymers such as PVAC or BTDE).

According to some exemplary embodiments of the invention, iron (III) nitrate nonahydrate (ferric nitrate) solutions in ethanol at a concentration ranging from 1 mM to 200 mM are effective as catalyst precursor treatments for continuous fiber preforms. More preferably, ethanol solutions of ferric nitrate with concentrations in the range of 25 mM to 125 mM have been shown to be very effective as a catalyst precursor treatment for carbon fiber preforms.

After treatment with the desired catalytic particle or catalyst precursor the preform is heated batchwise or in a continuous mode, to decompose the metal compound and yield the metal catalyst particle. This may be performed by heating at temperatures from 100° C. to 1000° C., in some cases in an oxidizing atmosphere. Preferably, this is performed in air at temperatures from 300° C. to 800° C. to yield an oxidized metal catalytic particle. Oxidation pretreatment has been discovered to give much higher VGCNT yield on continuous carbon fiber preforms.

In various other embodiments, after treatment with the desired catalytic particle or catalyst precursor, the preform is subsequently treated in a flowing gas mixture to reduce the catalyst to a metallic particle. Preferably, this is done in a hydrogen/nitrogen or hydrogen/argon gas mixture using hydrogen from 1% to 100% of the gas mixture at a temperature from 100° C. to 1200° C. for a period of time from 1 minute to 100 hours. Most preferably the hydrogen is at 10% of the gas mixture, the temperature is in the range from 400° C. to 800° C. and the time is in the range of 1 hour to 12 hours.

The vapor grown carbon fibers are then produced on the continuous fiber preforms from the distributed catalyst particles by contacting a gas phase hydrocarbon or hydrocarbon gas mixture with the preform at a temperature from 500° C. to 1200° C. The vapor grown carbon fibers grow from the catalyst particles within the woven or braided composite preform resulting in a tangled mass of vapor grown carbon fibers infiltrated in the continuous fiber preform. The vapor grown carbon fibers fill void spaces between the continuous fibers in the preform and may exhibit partial orientation and alignment depending on the geometry and architecture of the preform. If the composite preform is constructed from graphite or carbon fibers the vapor grown carbon fibers may fuse to the fibers leading to further enhancement of properties. In particular embodiments, the hydrocarbon gas is modulated or pulsed during the VGCNT growth process by turning the hydrocarbon gas flow on and off at periodic intervals while maintaining the flow of inert gas. The inventors have made the unexpected finding that, in some embodiments, this "pulsed" approach increases yield of VGCNT on carbon fiber preforms.

In some exemplary embodiments, the inventors have found that for some continuous preforms, it can be advantageous to initiate heating of the preform in an air atmosphere to oxidize the metal catalytic particle and carbon fiber surface to increase yield and improve the resulting morphology of the VGCNT infused preform. Contrary to literature reports of VGCNT growth on graphite substrates where the universal procedure is to purge the substrate with an inert gas prior to heating, the inventors have discovered the unexpected result that much higher yield of VGCNT and higher aspect ratio is obtained if air is maintained initially in the reactor vessel in a manner to allow partial oxidation of the catalytic particle and substrate surface. The enhanced growth may also be a result of burning off excess residual carbon from decomposition of the catalyst precursor.

The hydrocarbon gas can include acetylene, methane, propane, ethane, ethylene, benzene, natural gas or mixtures thereof. In some exemplary embodiments, the hydrocarbon gas is acetylene and nitrogen or argon gas is mixed with the acetylene prior to introduction in the growth furnace containing the composite preform, the growth temperature is between 700° C. and 850° C., the reaction time is between 15 minutes and 2 hours and the pressure is atmospheric. More preferably, the gas mixture is in the range of 1% to 20% acetylene and 99% to 80% nitrogen or argon, the temperature is between 750° C. and 850° C. and the reaction time is 30 to 120 minutes. Most preferably, the gas mixture is in the range of 1% to 10% acetylene and 99% to 90% nitrogen, the temperature is between 750° C. and 850° C. and the reaction time is 30 to 60 minutes.

The VGCNT infused continuous fiber preforms may subsequently be subjected to processing operations known to artisans such as heat treatment, solvent wash, and other treatments designed to remove the metal catalyst from the preform and change the chemical composition and physical characteristics of the vapor grown carbon fiber surface. Such surface treatment may be desirable to increase adhesion to a polymer or other matrix material in composite materials manufactured from these preforms, or to make the VGCNT infused preform more suitable for an application as an electrode, filter media, remediation media, gas storage media, or support for catalysis or cell growth and tissue regeneration.

As previously mentioned, after the VGCNT are grown in the preform it may be desirable to treat the preform with an aqueous solution of an inorganic acid, such as a mineral acid, to remove excess catalyst particles, if present, and to improve the bonding characteristics of the VGCNT infused preform. Non-limiting examples of suitable mineral acids include sulfuric acid, nitric acid, and hydrochloric acid. Preferred is nitric or sulfuric acid, or a sulfuric acid treatment followed by a nitric acid treatment.

In some exemplary embodiments, embodiment the continuous fiber preform is produced from either continuous polyacrylonitrile (PAN) or pitch carbon fibers (e.g. commercially sold as IM7®, AS4, T300, T700, PANEX® 33 (McKechnie, UK LTD, West Midlands, UK), T40-800, T650-35, YS-90A, CARBOFLEX® (Imerys Minerals LTD, Cornwall, UK) and vapor grown carbon fibers produced in situ in the continuous carbon fiber preform.

In various exemplary embodiments, the woven or braided preform is produced from commercially available, non-carbon fiber continuous fiber such as E-glass, S-glass, quartz, metal or ceramic and vapor grown carbon fibers are produced in situ in the continuous fiber preform. In these embodiments, the vapor grown carbon fibers can impart desirable mechanical, electrical and thermal characteristics to composites manufactured from these preforms. These substrate fibers in general have poor thermal and electrical conductivity. For example, infusion of the continuous fiber preform with VGCNT as described in this invention imparts electrical conductivity at extremely low levels of VGCNT.

Polymer matrix composite articles can be manufactured from these vapor grown carbon fiber reinforced composite preforms by infusing the preform with suitable matrix materials. In a preferred embodiment, the resulting vapor grown carbon fiber reinforced preforms are subsequently infused by a thermoplastic polymer in the molten state, a suitable low viscosity thermoset polymer resin, a polymer resin solution, powdered polymer particle dispersion, or any other means know by artisans to infuse a polymer into a continuous reinforcing fiber preform. Such polymer resins, thermoplastics and the like are commercially available from, for example, Solvay Advanced Polymers, L.L.C, Belgium, However, it should be appreciated that the manufacture of composites from the vapor grown carbon fiber reinforced preforms according to the present invention is not limited to polymer matrices. For example, VGCNT composites can exhibit useful properties when infused by metals, ceramics and ceramic precursors, pitches and other carbon precursors.

In various exemplary embodiments, the woven, braided or other preform is produced from either continuous PAN or pitch carbon fibers (e.g. commercially sold as IM7, AS4, T300, T700, PANEX® 33 (McKechnie, UK LTD, West Midlands, UK), T40-800, T650-35, YS-90A, CARBOFLEX® (Imerys Minerals LTD, Cornwall, UK), and other equivalent materials) and vapor grown carbon fibers produced in situ in the continuous carbon fiber preform, and the resulting vapor grown carbon fiber reinforced continuous fiber preform is infused with a suitable thermoset polymer resin and thermally processed into a finished composite article with useful properties. Examples of such commercially available thermoset polymer resins include P$^2$SI™ 635LM, P$^2$SI™ T3, OR P$^2$SI™ 700LM (Performance Polymer Solutions, Inc., Ohio).

Those of skill in the art will appreciate that according to the process and method described herein, the continuous fiber preform is in transit continuously during the growth process and being in complete and intimate contact with the environment of the growth furnace. Without being held to any particular theory, the continuous process of the present invention may therefore allow more complete and dense growth of VGCNT because every catalytic particle is intimately exposed to the growth environment and allows access of the gas mixtures to the interior of the fiber.

The following paragraphs enumerated consecutively from 1 through 50 provide for various aspects of the present invention. In one embodiment, in a first paragraph (1), the present invention provides: A continuous process for producing a carbon nanotube reinforced continuous fiber preform useful in the manufacture of carbon nanotube reinforced composite articles, comprising steps of: (a) dispersing a catalyst precursor throughout a continuous fiber preform; (b) converting the catalyst precursor into catalytic particles, the catalytic particles dispersed throughout the continuous fiber preform; (c) contacting the continuous fiber preform containing the catalytic particles with a hydrocarbon precursor gas; and (d) continually moving the treated preform through a growth furnace; whereby vapor grown carbon nanotubes are formed in situ at the catalytic particles dispersed throughout the continuous fiber preform to yield a carbon nanotube reinforced continuous fiber preform.

2. The process of paragraph 1, wherein the catalyst precursor comprises a solution of iron, nickel, cobalt, copper, chromium, molybdenum, a salt or a mixture thereof.

3. The process of paragraph 2, wherein the solvent for the catalyst precursor is, an alcohol, acetone, ethanol, isopropanol, hexane, methanol, water or mixtures thereof.

4. The process of paragraphs 1-3, wherein the catalyst precursor is iron acetate, iron nitrate, iron oxalate, nickel acetate, nickel nitrate, nickel oxalate, cobalt acetate, cobalt nitrate, cobalt oxalate, or a mixture thereof.

5. The process of paragraph 1, wherein the catalyst precursor is a solution of iron (III) nitrate nonahydrate (ferric nitrate) in ethanol, acetone or ethanol/acetone mixture.

6. The process of paragraphs 1-5, wherein the continuous fiber preform comprises a carbon preform, ceramic preform, glass preform, quartz preform, a graphite preform, a metal preform or combinations thereof.

7. The process of paragraphs 1-6, wherein the preform is a continuous multi-filament, braid, weave, yarn or tow.

8. The process of paragraphs 1-7, wherein the catalyst precursor treated preform is pyrolyzed to form catalytic particles within the preform in a pyrolysis furnace.

9. The process of paragraphs 1-8, wherein the pyrolysis further removes organic content from the preform.

10. The process of paragraphs 1-8, wherein the pyrolysis furnace includes and inlet and an outlet and a mechanism for continuously taking up the continuous preform as it exits the furnace.

11. The process of paragraphs 8-10, wherein the pyrolysis furnace further includes a mechanism for continuously belaying the continuous fiber preform into the pyrolysis furnace and wherein the rate of belaying and taking up are approximately equal.

12. The process of paragraphs 8-11, wherein the pyrolysis of the catalyst precursor takes place at between about 300° C. and 900° C.

13. The process of paragraphs 8-12, wherein the pyrolysis of the catalyst precursor takes place in an inert or oxidizing gas atmosphere.

14. The process of paragraph 13, wherein the pyrolysis of the catalyst precursor takes place in an argon or nitrogen atmosphere.

15. The process of paragraphs 8-14, wherein the pyrolysis of the catalyst precursor takes place from, between 1 second to 30 minutes.

16. The process of paragraphs 8-15, wherein the pyrolysis of the catalyst precursor takes place at from about 1 minute to about 15 minutes.

17. The process of paragraphs 8-16, wherein the pyrolysis of the catalyst precursor takes place at from about 500° C. to about 600° C.

18. The process of paragraphs 8-17, wherein the pyrolyzed preform is fed in to a front-end of a growth furnace with a precursor gas to induce growth of carbon nanotubes.

19. The process of paragraphs 18, wherein the fed-in preform is taken-up at a rear-end of the furnace.

20. The process of paragraphs 18-19, wherein the residence time of the preform through the growth furnace is approximately between about 1 minute to 1000 minutes.

21. The process of paragraphs 20, wherein the residence time of the preform through the growth furnace is between about 1 minutes and 120 minutes.

22. The process of paragraphs 18-21, wherein the pyrolyzed preform has a heat treatment step prior to induction of nanotube growth.

23. The process of paragraphs 18-22, wherein the heat treatment step and the nanotube growth step occur in the same furnace.

24. The process of paragraphs 18-23, wherein the nanotube growth step occurs sequentially after the heat treatment step.

25. The process of paragraphs 18-24, wherein the heat treatment step occurs at a temperature of about approximately 600° C. to about 900° C.

26. The process of paragraphs 18-25, wherein the heat treatment step occurs at a temperature of about 800° C.

27. The process of paragraphs 22-26, wherein the heat treatment step happens in an inert atmosphere.

28. The process of paragraphs 18-27, wherein the nanotube growth step occurs at a temperature of about approximately 700° C. to about 950° C.

29. The process of paragraphs 18-28, wherein the nanotube growth step occurs at a temperature of about 750° C. to about 850° C.

30. The process of paragraphs 18-29, wherein the precursor gas has a flow velocity in the furnace of approximately about 10 to 1000 cm/min.

31. The process of paragraphs 18-30, wherein the flow velocity in the furnace is approximately about 100 to 150 cm/min.

32. The process of paragraphs 18-31, wherein the precursor gas is provided in a reactive gas composition comprising about approximately 0.1% to 10% hydrocarbon precursor gas in 99.9% to 90% inert gas.

33. The process of paragraphs 18-32, wherein the precursor gas is provided in a reactive gas composition comprising about approximately 0.5% to 2% hydrocarbon precursor gas in 99.5% to 98% inert gas.

34. The process of paragraphs 18-33, wherein the precursor gas is provided in a reactive gas composition comprising about approximately 1% hydrocarbon precursor gas in 99% inert gas.

35. The process of paragraphs 18-34, wherein the reactive gas composition is 1% acetylene in nitrogen.

36. The process of paragraphs 22-35, wherein the wherein the growth furnace is a two-zone furnace and heat treatment occurs in a first zone and nanotube growth occurs in a second zone.

37. The process of paragraphs 22-36, wherein each zone has a different temperature.

38. The process of paragraphs 22-37, wherein the hydrocarbon precursor gas is entered into the furnace after the heat treatment zone.

39. The process of paragraphs 22-36, wherein the hydrocarbon precursor is entered into the furnace before the heat treatment zone but is not mixed with the purge gas until the second zone.

40. The process of paragraphs 1-17 wherein step (b) is carried out under reducing conditions.

41. The process of paragraphs 1-40, wherein the hydrocarbon precursor gas is, acetylene, methane, propane, ethane, ethylene, benzene, natural gas or mixtures thereof.

42. The process of claim 1, wherein multiple preforms are processed concurrently.

42. A carbon nanotube reinforced continuous fiber preform produced by the process of paragraphs 1-41.

43. The carbon nanotube reinforced continuous fiber preform of paragraph 42, wherein the fiber preform is carbon, quartz, glass, ceramic or metal multi filament yarn, tow, braid or weave.

44. A furnace useful for fabricating a continuous preform having vapor grown carbon nanotubes grown thereon in a continuous process comprising: a tube furnace having an inlet and an outlet and a growth zone; a mechanism for continuously feeding the preform into the inlet and a mechanism for continuously taking up the preform at the outlet; and wherein the rate of feeding-in and taking-up are approximately equal such that the continuous fiber preform is continuously fed into the furnace for the continuous process of growing carbon nanotubes, in situ on the continuous preform.

45. The furnace of paragraph 44, wherein an inert gas purge is applied to the furnace at the inlet.

46. The furnace of paragraphs 44-45, wherein the furnace further includes heat treatment zone.

47 The furnace of paragraphs 44-46, wherein a hydrocarbon precursor gas is entered into the furnace after the first zone and before the second zone.

48. The furnace of paragraphs 44-46, wherein the hydrocarbon precursor gas is entered into the furnace before the first zone and mixed with the purge gas before the growth zone.

49. A process for providing a carbon nanotube reinforced composite article comprising steps of: (a) dispersing a catalyst precursor throughout a continuous fiber preform; (b) converting the catalyst precursor into catalytic particles, the catalytic particles dispersed throughout the continuous fiber preform; (c) continually moving the treated preform through a pyrolysis furnace; (d) contacting the continuous fiber preform containing the catalytic particles with a hydrocarbon precursor gas to yield a carbon reinforced continuous fiber preform; wherein vapor grown carbon fibers are deposited in situ at the catalytic particles throughout the continuous fiber preform to yield a carbon reinforced continuous fiber preform; and (e) infusing the carbon reinforced continuous fiber preform with a thermoplastic or thermoset polymer, thermoplastic or thermoset polymer resin, metal, ceramic, ceramic precursor, or amorphous glass to provide a carbon nanotube reinforced composite article.

A carbon nanotube reinforced composite article produced by a process according to paragraph 49.

EXAMPLES

This invention is illustrated in the examples which follow. The examples are set forth to aid in an understanding of the invention but are not intended to, and should not be construed to limit in any way the invention as set forth in the claims which follow thereafter.

Example 1—Carbon Fiber Textile Infusion with VGCNT

Figure 1B:
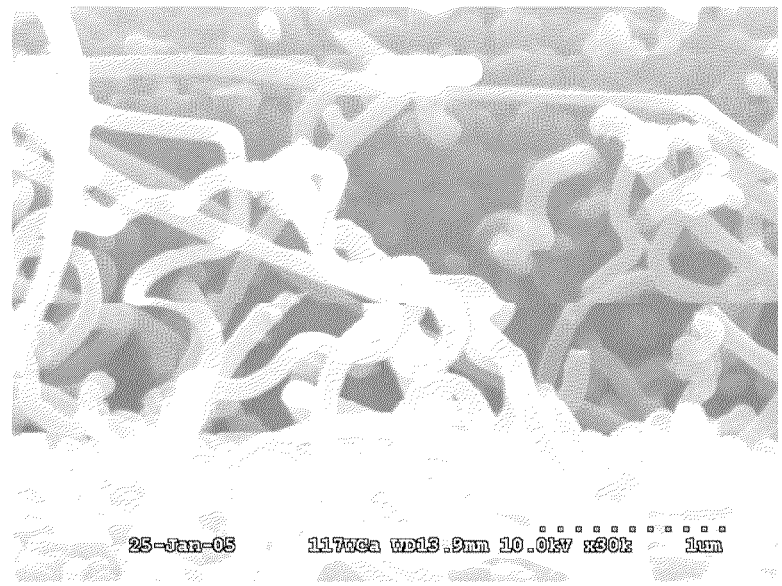
FIG. 1B is an SEM image of carbon preform sample from EXAMPLE 1 (approx. 23,600× magnification).

A piece of plain weave polyacrylonitrile (PAN) carbon fiber cloth was desized by solvent wash with toluene and acetone followed by oven drying. The sample was then immersed in a 125 mM solution of ferric nitrate in ethanol, and dried at 80° C. and placed in a 50 mm diameter tube furnace. The tube furnace was immediately heated to 800° C. and nitrogen flow of 90 sccm was started when the tube furnace temperature reached 100° C. After 15 minutes at 800° C. 5 sccm of acetylene was started and the nitrogen flow was reduced to 75 sccm. After 60 minutes the acetylene was turned off and the oven was cooled to 200° C. under nitrogen flow of 75 sccm. SEM images of the resulting VGCNT infused preform are shown in FIGS. 1A and 1B. In FIG. 1A, the continuous carbon fibers of the preform are clearly visible with the mass of entangled VGCNT infused into the preform. In FIG. 1B at higher magnification, the morphology of the well-formed VGCNT are shown fused to the continuous carbon fiber surface.

Example 2—Carbon Fiber Textile Infusion with VGCNT

Figure 2:
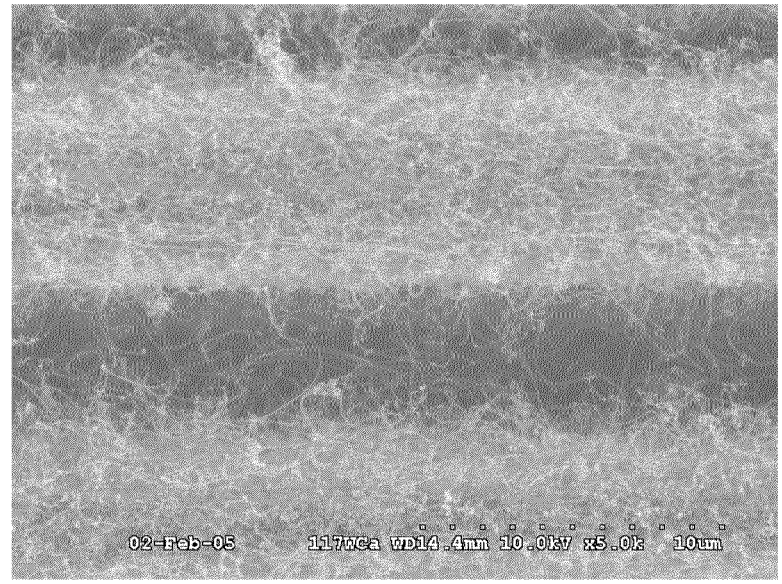
FIG. 2 is an SEM image of carbon preform sample from EXAMPLE 2 (approx. 3950× magnification).

A piece of plain weave PAN carbon fiber cloth was desized by solvent wash with toluene and acetone followed by oven drying. The sample was then immersed in a 100 mM solution of ferric nitrate in ethanol, and dried at 80° C. The sample was then heated at 300° C. for 30 hours in an air convection oven, cooled, and placed in a 50 mm diameter tube furnace. The tube furnace was heated to 750° C. and when it reached 600° C. nitrogen flow of 90 sccm was started. After 15 minutes at 750° C. 5 sccm of acetylene was started and the nitrogen flow was increased to 250 sccm. After 60 minutes the acetylene was turned off and the oven was cooled to 200° C. under nitrogen flow of 90 sccm. An SEM image of the resulting VGCNT infused preform is shown in FIG. 2. In FIG. 2, the continuous carbon fibers of the preform are clearly visible with the mass of entangled VGCNT infused into the preform.

Example 3—Carbon Fiber Textile Infusion with VGCNT

Figure 3:
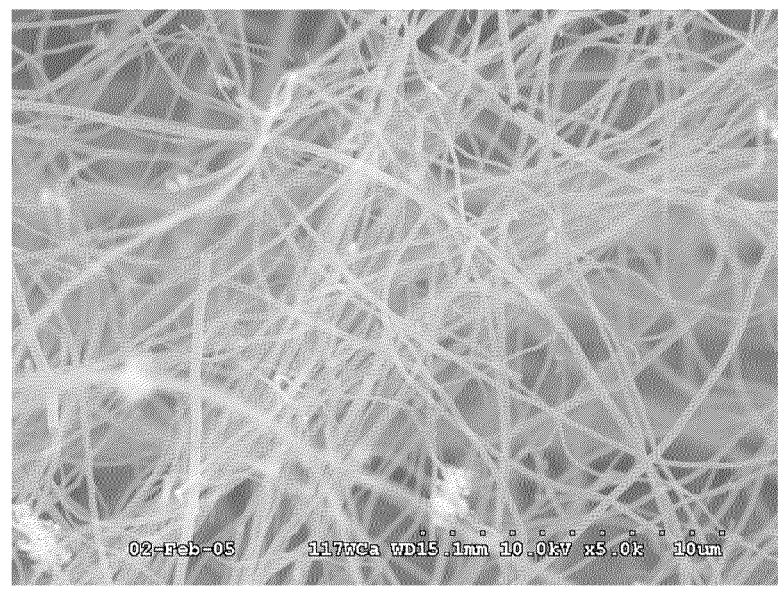
FIG. 3 is an SEM image of carbon preform sample from EXAMPLE 3 (approx. 3950× magnification).

A piece of plain weave PAN carbon fiber cloth was desized by solvent wash with toluene and acetone followed by oven drying. The sample was then immersed in a freshly prepared 100 mM solution of ferric nitrate in ethanol, and dried at 80° C. The sample was then heated at 300° C. for 30 hours in an air convection oven, cooled, and placed in a 50 mm tube furnace. The tube furnace was heated to 750° C. and when it reached 600° C. nitrogen flow of 90 sccm was started. After 15 minutes at 750° C. 5 sccm of acetylene was started and the nitrogen flow was increased to 250 sccm. After 60 minutes the acetylene was turned off and the oven was cooled to 200° C. under nitrogen flow of 90 sccm. An SEM image of the resulting VGCNT infused preform is shown in FIG. 3. In FIG. 3, the continuous carbon fibers of the preform are obscured by the high yield dense growth mass of entangled VGCNT infused into the preform.

Example 4—Carbon Fiber Textile Infusion with VGCNT

Figure 4:
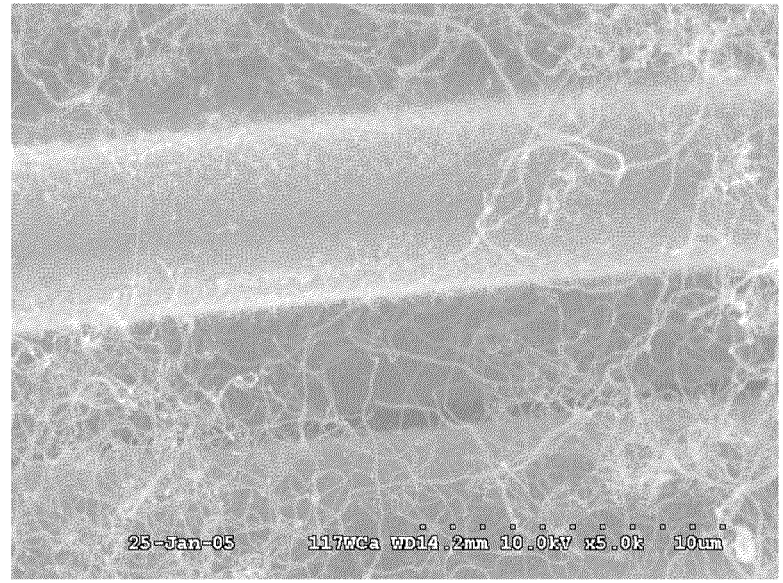
FIG. 4 is an SEM image of carbon preform sample from EXAMPLE 4 (approx. 3950× magnification).

A piece of plain weave PAN carbon fiber cloth was desized by solvent wash with toluene and acetone followed by oven drying. The sample was then immersed in a freshly prepared 25 mM solution of ferric nitrate in ethanol, and dried at 80° C. then placed in a 50 mm tube furnace. The tube furnace was heated to 750° C. and when it reached 100° C. nitrogen flow of 90 sccm was started. After 15 minutes at 750° C. 5 sccm of acetylene was started and the nitrogen flow was reduced to 75 sccm. After 30 minutes the acetylene was turned off and the oven was cooled to 200° C. under nitrogen flow of 90 sccm. An SEM image of the resulting VGCNT infused preform is shown in FIG. 4. In FIG. 4, the continuous carbon fibers of the preform are visible along with the high yield dense growth mass of entangled VGCNT infused into the preform.

Example 5—Carbon Fiber Textile Infusion with VGCNT Using a Reduced Catalyst

Figure 5:
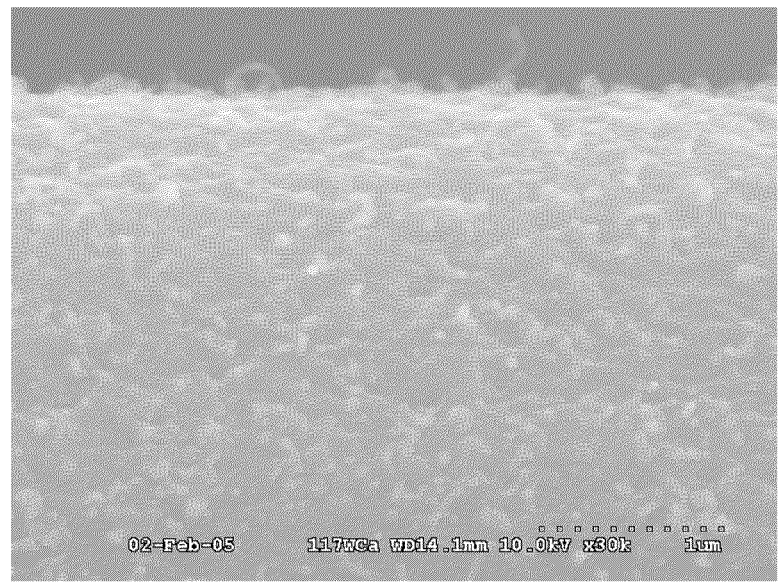
FIG. 5 is an SEM image of carbon preform sample from EXAMPLE 5 (approx. 23,600× magnification).
Figure 8:
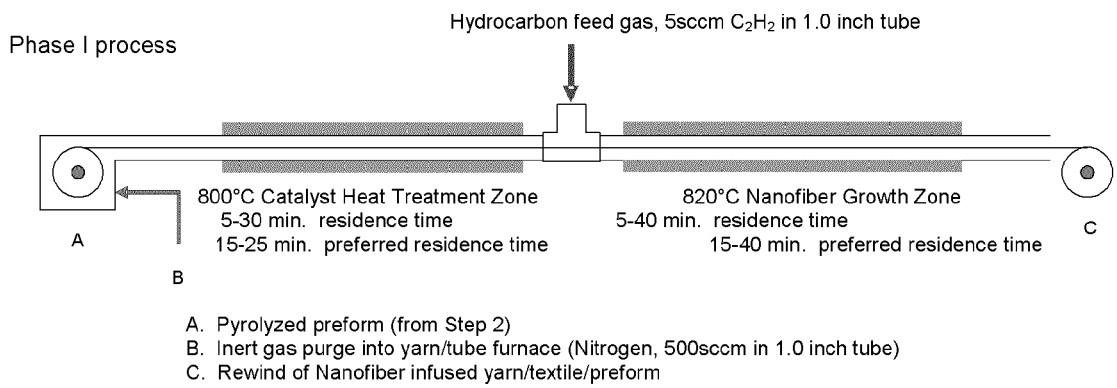
FIG. 8 is a diagrammatic representation of Phase I of steps 3 and 4 in the process for the fabrication of a continuous preform according to one exemplary embodiment of the invention. This figure illustrates the continuous catalyst heat-treatment and nanotube growth process using a two-part tube furnace.

A piece of plain weave PAN carbon fiber cloth was desized by solvent wash with toluene and acetone followed by oven drying. The sample was then immersed in a freshly prepared 75 mM solution of ferric nitrate in ethanol, and dried at 80° C. The sample was subsequently was heated in air at 300° C. to decompose and oxidize the iron catalyst. The sample was then placed in a 50 mm tube furnace and heated to 500° C. under a nitrogen flow of 250 sccm. At 500° C. the nitrogen flow was reduced to 150 sccm and 15 sccm of hydrogen was introduced. These conditions were held for four hours to reduce the catalytic particles to metallic iron. The hydrogen flow was then stopped and the nitrogen increased to 250 sccm and the tube furnace cooled to 50° C. Under a flow of 250 sccm of nitrogen the tube furnace was heated to 700° C. When it reached 700° C. the nitrogen flow was reduced to 90 sccm. After 15 minutes at 700° C. 5 sccm of acetylene was started and the nitrogen flow was reduced to 75 sccm. After 60 minutes the acetylene was turned off and the oven was cooled to 200° C. under nitrogen flow of 90 sccm. An SEM image of the resulting VGCNT infused preform is shown in FIG. 5. In FIG. 5, the continuous carbon fibers of the preform are visible along with the dense growth of low aspect ratio VGCNT infused into the preform.

Example 6—Conductive Composite Fabricated from Quartz Fabric Infused with VGCNT

A piece of high temperature resistant fabric woven with quartz glass yarns (available from JPS Composite Materials Corporation under federally-registered trademark ASTRO-QUARTZ II®, style 525) was solution coated with a 75 mM ferric nitrate solution in ethanol and dried for 1 hour at 80° C. The sample was then weighed, placed in a 50 mm tube furnace, nitrogen flow was started at 75 sccm, and heated to 750° C. After 15 minutes at 750° C. acetylene flow of 15 sccm was started to initiate VGCNT growth. After 1 hour the acetylene flow was stopped and the tube furnace was cooled to room temperature. The resulting fabric sample had a uniform metallic, shining dark gray appearance and was found to have increased in mass by 0.15%. The sample was then cut into strips 12 cm wide and 60 cm long aligned in the warp direction and a composite fabricated by coating 6 of these strips with an epoxy resin (EPON® 862/Cure Agent W) and compression molding in a heated press for 4 hours at 250° F. and 2 hours at 350° F. The sample was then removed from the mold and the resistance measured at several points in both the warp and fill directions. The average resistivity between probes 1 cm apart in the warp direction was found to be 0.130 Ω·meter and the average resistivity between probes 1 cm apart in the weft (fill) direction was found to be 0.135 Ω·meter. This data indicates that the conductivity of the composite material was uniform in the plane of the fabric and was increased by approximately a factor of $10^{10}$ to $10^{14}$ at a composite mass fraction of about 0.1% VGCNT.

Example 7—Continuous Process for the Fabrication of a Continuous Preform

Any suitable continuous media such as: multi-filament yarns; mono-filaments; continuous woven or braided constructions prepared from yarns. Materials for the preforms include ceramic fibers, graphite and carbon fibers, glass and quartz fibers, and metals. The inventors have successfully demonstrated the process on several types of carbon and graphite fibers, quartz fibers, and several grades of SiC yarns including those sold under the tradenames Nicalon™-CG, Hi-Nicalon™, and Hi-Nicalon™ (Nippon Carbon Co.) coated with proprietary coatings for ceramic matrix composite (CMC) processing. See, Table 1.

TABLE 1

| Continuous Fiber Preform | Manufacturer |
| --- | --- |
| Nicalon ™-CG (SiC) | Nippon Chemical Company LTD, Japan |
| Hi-Nicalon ™ (SiC) | Nippon Chemical Company LTD, Japan |
| Hi-Nicalon ™ (SiC)With Coatings | Nippon Chemical Company LTD, Japan |
| Astroquartz II, Style 525 Textile (Quartz) | JPS Composite Materials Corp. |
| AS4 Carbon Fiber (Carbon) | Hexcel Corp. |
| AU4 Carbon Fiber (Carbon) | Hexcel Corp. |
| T650-35 Carbon Fiber (Carbon) | Cytec Carbon Fibers LLC |
| IM7 Carbon Fiber (Carbon) | Hexcel Corp. |

The continuous process for the production of nanotube infused preforms consists of four distinct steps: 1) treatment of the preform with catalyst particle precursor solution; 2) "burn-off" of any organic preform sizing and decomposition of the catalyst precursor solution and to form active catalytic particles; 3) heat treatment of the catalyzed preform; and 4) contacting the catalyst treated preform with a decomposed hydrocarbon precursor gas to induce catalytic carbon nanotube growth.

Step 1: Yarn Catalyst Treatment

FIG. 6 is a schematic of one exemplary embodiment of the invention showing a method for the continuous treatment of the preform with catalyst solution. Several types of catalyst bearing salt solutions have been evaluated including Iron, Nickel, and Cobalt compounds, See, for example, Table 2 below. In one exemplary embodiment the solution is a solution prepared from Iron(III)Nitrate, $(Fe(NO_3)_3 \cdot 9H_2O$. Several concentrations (10 mM to 250 mM) have been evaluated and 100 mM has been found to yield optimal growth. The inventors have investigated several different solvents (water, acetone, ethanol, isopropanol, hexanes, methanol, and mixtures thereof) for the catalyst salt. While each has shown the ability to infuse the preform with catalyst precursors, in some exemplary embodiments, solvent systems which wick rapidly into the fibrous preforms and dry rapidly in air at room temperature have so far been shown to be most optimal. Such systems include, for example dipping/drying process using a 50:50 (volume: volume) mixture of acetone and ethanol for the catalyst precursor solution.

Step 2: Catalyst Pre-Heat-Treatment Pyrolysis Step

Continuous fiber preforms are usually sized at a level of 0.5 wt % to 3 wt % to facilitate weaving and handling characteristics. Generally, the inventors have found that it is desirable to use the preforms as received for best handling characteristics and economy. This organic sizing content may not interfere with the catalyst solution treatments, but was found to inhibit nanotube growth in subsequent steps unless it is pyrolyzed. Compared to a "batch type" process, this aspect of the processing is unique. In a continuous process, the "up stream" operations affect the "down stream" operations. For batch-wise processing the pyrolysis step can be eliminated since the off-gassing due to pyrolysis of the organic content is carried away from the preform by the inert gas flow. Additionally, without being held to any particular theory, the inventors postulate that the iron (III) nitrate decomposes during this step to yield an iron oxide catalytic particle (the exact nature of which has not been determined). The inventors intentionally allow the catalyst to oxidize since the yarns can be stored and handled in the atmosphere. It should be appreciated however, that the continuous process is not hindered by keeping the catalyst in the unoxidized state. Many other nanotube techniques utilize a reduction step where any oxides of the metal particles are reduced to elemental metal particles. While the inventors have not found such an explicit reduction step necessary, it is within the scope of the invention. Without being held to any particular theory, it is likely that carbon deposits from pyrolysis, as well as carbon present on the continuous fiber preform surface, reduce oxides of the iron upon heating to yield elemental metal catalytic particles. FIG. 7 is a schematic illustrating one exemplary embodiment of the current invention showing a method for the continuous pyrolysis of the catalyst solution treated preform. In various exemplary embodiments, heat treatment is carried out in a nitrogen atmosphere between 300° C. and 900° C., for 1 minute to 15 minutes residence. In some exemplary embodiments heat treatment conditions are between 500° C. and 600° C. in the range of 1 minute to 15 minutes. The pyrolyzed preforms are stable in ambient conditions and atmospheric exposure does not adversely affect subsequent processing.

Step 3: Heat Treatment of Catalyzed Preform

In various exemplary embodiments, the heat treatment step and nanotube growth are carried out sequentially in a closed system as shown in FIGS. 3 and 4. The inventors have found that the heat treatment step yields better growth of nanotubes on the continuous preforms. While the exact reason for improvement has not been determined, the inventors speculate that the iron may reduce at these temperatures, or that reactions with carbon present from pyrolysis reacts with the oxide particles to yield an active catalytic particle. The heat treatment step has been carried out over a range of temperatures from 600° C. to 900° C. and 800° C. determined to be the preferred temperature. The heat treatment is carried out in an inert gas atmosphere (any inert gas can be used however, nitrogen is generally preferred due to its less expensive cost).

Figure 9:
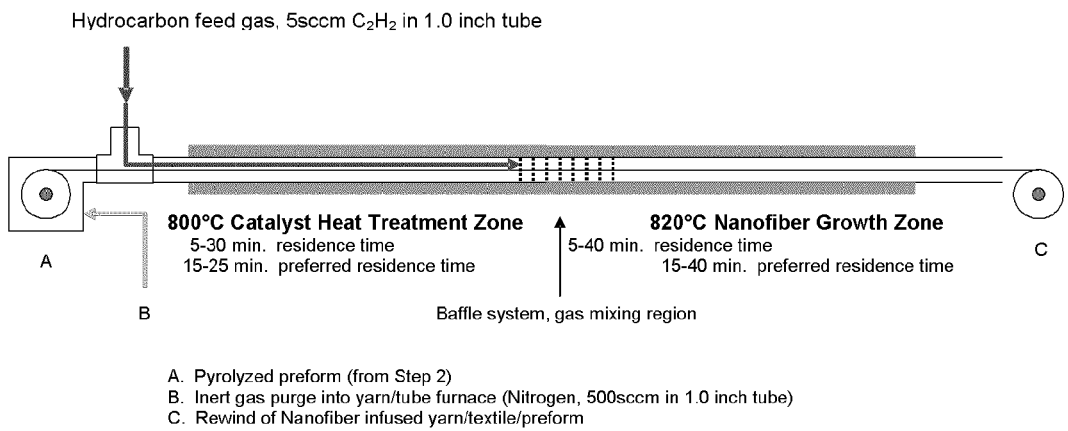
FIG. 9 is a diagrammatic representation of Phase II of steps 3 and 4 in the process for the fabrication of a continuous preform according to one exemplary embodiment of the invention. This figure illustrates the continuous catalyst heat-treatment and nanotube growth process using a unitary tube furnace with an intervening baffle.

In various exemplary embodiments according to the invention, the preform is not allowed to cool down after the heat treatment step. A schematic of this embodiment is shown in FIG. 9. Generally, the inventors have found that the result of this modification is consistently longer and denser nanotube growth on the preform fiber surfaces. However, those of skill in the art will recognize that, according to this embodiment, the hydrocarbon precursor gas should be introduced prior to the heat treatment zone and this will generally require a mixing system (shown as baffles) to be incorporated to achieve a well-mixed homogeneous reactive gas composition in the growth furnace.

Step 4: Nanotube Growth

The nanotube growth on the preform surfaces is accomplished by introducing a hydrocarbon feed or precursor gas after the heat treatment step. In various exemplary embodiments, acetylene ($C_2H_2$) is the preferred feed gas however; the inventors have tried a variety of precursor gases and found that they are capable of forming VGCNT including acetylene, methane, propane, ethane, ethylene, benzene, natural gas. The preferred reactive gas composition for nanotube growth is 1% $C_2H_2$ in nitrogen (nominally 5 sccm $C_2H_2$, 500 sccm $N_2$ in a one-inch tube furnace). The gas composition is critical for optimal nanotube growth and the gas flow rate is also a critical aspect of the growth process. The preferred bulk gas velocity into the reactor is approximately 100 cm/min and in the tube furnace the velocity is approximately 300 cm/min (adjusted for gas expansion at reaction temperatures). In some exemplary embodiments, the preferred nanotube growth temperature is between 700° C. and 950° C. with the most preferred temperature approximately 850° C.

Example 8—Continuous Growth of Carbon Nanotubes on a 60 cm Length of Silicon Carbide Fiber Yarn (Hi-Nicalon™) at Atmospheric Pressure A 100 mM Ferric Nitrate Nonahydrate ($Fe(NO_3)_3 \cdot 9H_2O$) solution in an acetone and ethanol mixture (50/50) was prepared and allowed to stand for 24 hours. A 60 cm length of as-received silicon carbide fiber yarn (Hi-Nicalon™) was used for the continuous CNT growth process. The silicon carbide fiber yarn (Hi-Nicalon™) was soaked in the catalyst solution for 5 minutes and hung vertically to dry at room temperature. The dry catalyst treated yarn was then bonded to a 305 cm length of untreated ceramic grade silicon carbide fiber yarn (Nicalon™ CG) that served as a leader to continuously pull the catalyst treated yarn through the growth furnace. The treated silicon carbide fiber yarn (Hi-Nicalon™) was then placed into a 25 mm diameter quartz tube in a tube furnace at 500° C. under a nitrogen flow of 500 sccm for pyrolysis of the catalyst at a residence time of 15 minutes and the "downstream" end of the quartz tube was open to the atmosphere. The carbon nanotube growth on the continuous yarn was conducted in a 25 mm diameter quartz tube reactor that was mounted in a two-zone tube furnace. The furnace was 80 cm in overall length with each zone 40 cm in length. The spool of yarn was placed into a container fitted with a nitrogen gas inlet that was sealed to the quartz reaction tube at the upstream end of the tube such that the untreated ceramic grade silicon carbide fiber yarn (Nicalon™ CG) leader was fed down the tube reactor through the furnaces to be used to pull the continuous treated silicon carbide fiber yarn (Hi-Nicalon™) through. In this way the inert nitrogen gas purges the yarn chamber and then flows down the reaction tube through the furnace and out the downstream end open to the atmosphere. The first zone of the furnace was set to a temperature of 800° C. and the second set to a temperature of 820° C. Nitrogen flow was set to 500 sccm in the reactor system and maintained throughout the entire process. After a period of 15 minutes to allow the reactor system to completely purge, the yarn was pulled through the entire length of the furnaces at a speed of 1.27 cm/minute. When the free end of the silicon carbide fiber yarn had entered the tube furnace such that the 60 cm length of yarn was in the tube furnace, high purity acetylene was introduced upstream of the tube furnace at a flow rate of 5.0 sccm (1% concentration of acetylene in nitrogen). This process created a gradient of heat treatment and growth exposure times along the length of the catalyst treated silicon carbide fiber yarn. When the silicon carbide fiber yarn exited the tube furnace, the acetylene flow was stopped and the reactor cooled under nitrogen purge.

Carbon nanotubes were found grown from the surfaces of the individual filaments within the silicon carbide fiber yarn and along the length of the yarn. The surface density and the characteristics of the carbon nanotubes varied depending on the length of time each segment spent respectively in the zones of the furnaces and the length of growth time with acetylene present. In FIGS. 10A and 10B, the scanning electron microscope images show the nanotube growth for the segment of silicon carbide fiber yarn preform 46 cm from the leading edge (FIG. 10A) and 5 cm from the leading edge (FIG. 10B).

Example 9—Continuous Growth of Carbon Nanotubes on AU4-12K Carbon Fiber Yarn at Atmospheric Pressure A 100 mM Ferric Nitrate Nonahydrate ($Fe(NO_3)_3 \cdot 9H_2O$) solution in an acetone and ethanol mixture (50/50) was prepared and allowed to stand for 24 hours. A 60 cm length of as-received AU4-12K un-sized yarn was used. (Unsized AU4 12K (12000 filaments per tow) carbon fiber available from Hexcel Corp. Stamford, Conn.) The AU4-12K unsized yarn was soaked in the catalyst solution for 5 minutes and hung vertically to dry at room temperature. The dry catalyst treated yarn was then bonded to a 305 cm length of untreated T650-35 6K yarn (Cytec Carbon Fibers LLC, Piedmont, S.C.) that served as a leader to continuously pull yarn through the reactor (in the same manner as described in Example 1). The treated AU4-12K yarn was then pulled continuously through a 75 cm tube furnace at 5 cm/minute in a 25 mm diameter quartz tube at 500° C. under a nitrogen flow of 500 sccm for pyrolysis of the catalyst for a residence time of 15 minutes. The "downstream" end of the quartz tube was left open to the atmosphere. The carbon nanotube growth on the continuous AU4-12K yarn was conducted in a 25 mm diameter quartz tube reactor that was mounted into a two-zone tube furnace. The furnace was 32 inches in overall length with each zone 16 inches in length. The spool of yarn was placed into a container fitted with a nitrogen gas inlet that was sealed to the quartz reaction tube at the "upstream" end of the tube such that the yarn was fed down the tube reactor through the furnaces and used to pull the continuous treated AU4-12K yarn through. In this way the inert nitrogen gas purges the yarn chamber and then flows down the reaction tube through the furnace and out the downstream end open to the atmosphere. The first zone of the furnace was set to a temperature of 800° C. and the second set to a temperature of 820° C. Nitrogen flow was set to 500 sccm in the reactor system and maintained throughout the entire process. After a period of 15 minutes to allow the reactor system to completely purge the yarn was pulled through the entire length of the furnaces at a speed of 1.27 cm/minute. When the free end of the AU4-12K yarn had just entered the tube furnace high purity acetylene was introduced upstream of the tube furnace at a flow rate of 5.0 sccm (1% concentration of acetylene in nitrogen). This process created a gradient of heat treatment and growth exposure times along the 60 cm length of the catalyst treated AU4-12K yarn in the tube furnace. When the AU4-12K yarn exited the tube furnace the acetylene flow was stopped and the reactor cooled under nitrogen purge.

Carbon nanotubes were found to grow from the surfaces of the individual filaments in the AU4-12K yarn along the 60 cm length. The surface density and the characteristics of the carbon nanotubes varied depending on the length of time each segment spent respectively in the zones of the furnaces and the length of growth time with acetylene present. In FIGS. 11A and 11B the scanning electron microscope images show the nanotube growth for the segment of AU4-12K 46 cm from the leading edge (FIG. 11A) and 5 cm from the leading edge (FIG. 11B).

Example 10—Continuous Growth of Carbon Nanotubes at Atmospheric Pressure on a 30 Meter Length of Silicon Carbide Fiber (Hi-Nicalon™) with an Additive to Catalyst Solution to Improve Wetting A 5 wt % solution of Benzophenone-3,3',4,4'-tetracarboxylic dianhydride (BTDA) in anhydrous ethanol was refluxed for 2 hours to convert the BTDA to a soluble diethyl ester-acid derivative (BTDE). This solution was subsequently diluted with acetone to 0.5 wt % solution. A 100 mM Ferric Nitrate Nonahydrate ($Fe(NO_3)_3 \cdot 9H_2O$) catalyst solution was prepared using this BTDE-ethanol-acetone solution and allow to stand for 24 hours. A 30 m length of as-received silicon carbide ceramic fiber yarn was used (Hi-Nicalon™). The yarn length was level wound onto a glass spool and then continuously run through a sonicated bath of the catalyst solution with a residence time of approximately 10 seconds then immediately through a second bath of hexanes and dried in air at room temperature, then level wound onto a glass spool. The carbon nanotube growth on the continuous yarn was conducted in a 25 mm diameter quartz tube reactor 250 cm in length that was mounted into two separate tube furnaces with a 50 cm gap between the furnaces. Both tube furnaces were 40 cm in overall length. The spool of yarn was placed into a container fitted with a nitrogen gas inlet that was sealed to the quartz reaction tube at the "upstream" end of the tube such that the yarn was fed down the tube reactor through the furnaces and used to pull the continuous treated silicon carbide (Hi-Nicalon™) yarn through. In this way the inert nitrogen gas purges the yarn chamber and then flows down the reaction tube through the furnaces and out the downstream end open to the atmosphere. The first tube furnace was set to a temperature of 800° C. and the second set to a temperature of 820° C. Nitrogen flow was set to 500 sccm in the reactor system and maintained throughout the entire process. Acetylene was introduced through a gas fitting in the quartz tube in the gap between the tube furnaces at a flow rate of 5.0 sccm (1% concentration of acetylene in nitrogen). After a period of 15 minutes to allow the reactor system to completely purge the yarn was pulled through the entire length of quartz tube through the furnaces at a speed of 1.27 cm/minute and level wound onto a glass spool. After a period of approximately 8 hours; 600 cm of the silicon carbide yarn (Hi-Nicalon™) had been pulled through the reactor. The acetylene was shut off and the furnaces allowed to cool under nitrogen flow with the silicon carbide yarn (Hi-Nicalon™) still in the reactor. Approximately 16 hours later, the furnaces were again heated to 800° C. and 820° C. respectively, 5.0 sccm acetylene flow started again and the preform yarn (Hi-Nicalon™) pulled through at a rate of 1.27 cm/min for approximately 8 hours. This cycle was repeated each day for a total of 5 days until the entire 30 m length of preform yarn (Hi-Nicalon™) was continuously run through the carbon nanotube reactor system Carbon nanotubes were found to grown from the surfaces of the individual filaments in the preform yarn along its 30 m length. In FIG. 12 the scanning electron microscope images show the carbon nanotube growth on a segment of yarn from the middle of the 30 m length of preform yarn.

Example 11—Growth of Carbon Nanotubes at Atmospheric Pressure on a 105 cm Length of Ceramic Grade Silicon Carbide Fiber Yarn (CG-Nicalon™) Resulting in Higher Electrical Conductivity A 100 mM Ferric Nitrate Nonahydrate ($Fe(NO_3)_3 \cdot 9H_2O$) solution in an acetone and ethanol mixture (50/50) was prepared and allowed to stand for 24 hours. A 105 cm length of as-received ceramic grade silicon carbide fiber yarn (CG-Nicalon™) was used for the continuous CNT growth process. The ceramic grade silicon carbide fiber yarn was soaked in the catalyst solution for 5 minutes and hung vertically to dry at room temperature. The treated ceramic grade silicon carbide fiber yarn preform was then placed into 50 mm quartz tube in a tube furnace at 500° C. under a nitrogen flow of 500 sccm for pyrolysis of the catalyst for a residence time of 15 minutes and the "downstream" end of the quartz tube was open to the atmosphere. The carbon nanotube growth on the continuous yarn was conducted in a 25 mm quartz tube reactor that was mounted into a two-zone tube furnace. The furnace was 80 cm in overall length with each zone 40 cm in length. The catalyst treated end of the yarn was placed into a container fitted with a nitrogen gas inlet that was sealed to the quartz reaction tube at the upstream end of the tube. In this way, the inert nitrogen gas purges the yarn chamber and then flows down the reaction tube through the furnace and out the downstream end open to the atmosphere. The first zone of the furnace was set to a temperature of 800° C. and the second set to a temperature of 820° C. Nitrogen flow was set to 500 sccm in the reactor system and maintained throughout the entire process. After a period of 15 minutes, to allow the reactor system to completely purge, the yarn was pulled into the first tube furnace section and held there for 15 minutes. The treated yarn length was then pulled into the second tube furnace and high purity acetylene was introduced upstream of the tube furnace at a flow rate of 5.0 sccm (1% concentration of acetylene in nitrogen) and kept flowing for 15 minutes. After 15 minutes the acetylene flow was stopped, the treated yarn was pulled out of the second tube furnace and allowed to cool under nitrogen purge for 5 minutes before being pulled out of the quartz reactor tube into the atmosphere Carbon nanotubes were found to grow from the surfaces of the individual filaments in the ceramic grade silicon carbide fiber yarn preform along its entire 15 cm length. In FIGS. 13A and 13B SEM images show the nanotube growth for the ceramic grade silicon carbide fiber yarn. The electrical resistance of the yarn was found to decrease from 2.88×10$^8$ Ω/cm to 5.00×10$^3$ Ω/cm after carbon nanotube growth demonstrating the dramatic enhancement in conductivity from the in situ formation of carbon nanotubes. FIGS. 13A and B are the same preparation, at 350×, and 1300× magnification respectively.

Example 12—Continuous Growth of Carbon Nanotubes at Atmospheric Pressure on a 5 Meter Length of Ceramic Grade Silicon Carbide Fiber Yarn and Fabrication of a Polyimide Matrix Composite with Improved Fracture Toughness A 100 mM Ferric Nitrate Nonahydrate (Fe(NO$_3$)$_3$.9H$_2$O) solution in isopropanol was prepared and allowed to stand for 24 hours. A 5 m length of as-received ceramic grade silicon carbide fiber yarn. The 5 m length of yarn was level wound onto a glass spool and dipped into a bath of the catalyst solution with a residence time of approximately 1 minute then immediately dipped into a second bath of hexanes and dried in air at room temperature. The carbon nanotube growth on the continuous yarn was conducted in 25 mm diameter quartz tube reactor 250 cm in length that was mounted into two separate tube furnaces with a 50 cm gap between the furnaces. Both tube furnaces were 40 cm in overall length. The spool of yarn was placed into a container fitted with a nitrogen gas inlet that was sealed to the quartz reaction tube at the "upstream" end of the tube such that the yarn was fed down the tube reactor through the furnaces and used to pull the continuous treated ceramic grade silicon carbide fiber yarn through. In this way the inert nitrogen gas purges the yarn chamber and then flows down the reaction tube through the furnaces and out the downstream end open to the atmosphere. The first tube furnace was set to a temperature of 800° C. and the second set to a temperature of 820° C. Nitrogen flow was set to 500 sccm in the reactor system and maintained throughout the entire process. Acetylene was introduced through a gas fitting in the quartz tube in the gap between the tube furnaces at a flowrate of 5.0 sccm (1% concentration of acetylene in nitrogen). After a period of 15 minutes, to allow the reactor system to completely purge, the yarn was pulled through the entire length of quartz tube through the furnaces at a speed of 1.27 cm/minute and level wound onto a glass spool. After a period of approximately 7 hours the entire 500 cm length of ceramic grade silicon carbide fiber yarn had been pulled through the reactor.

Figure 14:
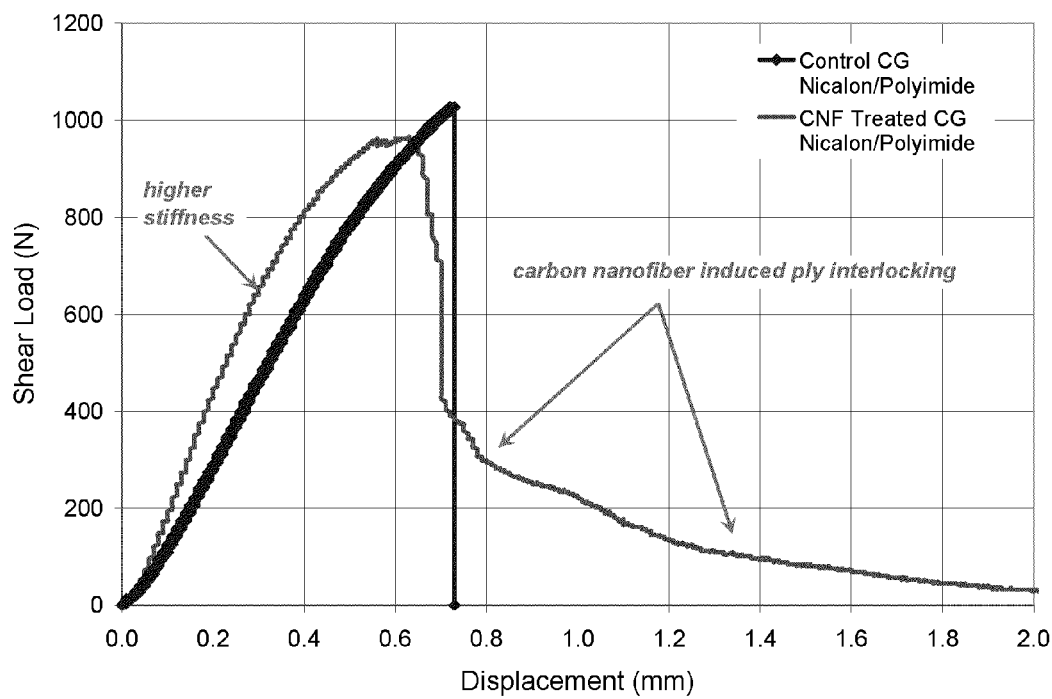
FIG. 14 is a graph comparing the load-displacement curves for unidirectional composites fabricated with conventional (control) and VGCNT-treated ceramic grade SiC fiber yarn (Nicalon™ CG) according to one embodiment of the invention. As shown, the control product is less stiff and upon application of a load the control failed while the composite according to the invention illustrates over 200% greater elongation to failure and 55% higher fracture toughness.

Carbon nanotubes were found to grown from the surfaces of the individual filaments in the ceramic grade silicon carbide fiber yarn along its 5 m length. The 5 m length of yarn was used to fabricate a polyimide matrix composite material using P$^2$SI™ 635LM (Performance Polymer Solutions, Inc.) commercial resin solution loaded with carbon particles by compression molding. The unidirectional pre-ceramic composite had a fiber volume fraction of approximately 20%. Interlaminar shear strength was measured according to ASTM D2344. Carbon nanotube induced ply interlocking was observed in the load-displacement curve, as shown in FIG. 14, compared to an equivalent composite fabricated with as-received ceramic grade silicon carbide fiber yarn. As shown in FIG. 14, the nanotube treated yarn composite exhibited a higher stiffness, higher elongation to failure (over 200%), and 55% higher fracture toughness (area under the load-displacement curve of 399 N-mm for the untreated ceramic grade silicon carbide fiber yarn control compared to 617 N-mm using nanotube treated yarn, an increase of approximately 55%).

Example 13—Continuous Growth of Carbon Nanotubes at Atmospheric Pressure on a 5 Meter Length of Ceramic Grade Silicon Carbide Fiber Yarn and Fabrication of a Ceramic Matrix Composite A 100 mM Ferric Nitrate Nonahydrate (Fe(NO$_3$)$_3$.9H$_2$O) solution in isopropanol was prepared and allowed to stand for 24 hours. A 5 m length of as-received ceramic grade silicon carbide fiber yarn was used. The 5 m length of yarn was level wound onto a glass spool and dipped into a bath of the catalyst solution with a residence time of approximately 1 minute then immediately dipped into a second bath of hexanes and dried in air at room temperature. The carbon nanotube growth on the continuous yarn was conducted in a 25 mm diameter quartz tube reactor 250 cm in length that was mounted into two separate tube furnaces with a 50 cm gap between the furnaces. Both tube furnaces were 40 cm in overall length. The spool of yarn was placed into a container fitted with a nitrogen gas inlet that was sealed to the quartz reaction tube at the "upstream" end of the tube such that the yarn was fed down the tube reactor through the furnaces and used to pull the continuous treated ceramic grade silicon carbide fiber yarn through. In this way the inert nitrogen gas purges the yarn chamber and then flows down the reaction tube through the furnaces and out the downstream end open to the atmosphere. The first tube furnace was set to a temperature of 800° C. and the second set to a temperature of 820° C. Nitrogen flow was set to 500 sccm in the reactor system and maintained throughout the entire process. Acetylene was introduced through a gas fitting in the quartz tube in the gap between the tube furnaces at a flowrate of 5.0 sccm (1% concentration of acetylene in nitrogen). After a period of 15 minutes, to allow the reactor system to completely purge, the yarn was pulled through the entire length of quartz tube through the furnaces at a speed of 1.27 cm/minute and level wound onto a glass spool. After a period of approximately 7 hours the 50 m length of ceramic grade silicon carbide fiber yarn had been pulled through the reactor.

Figure 15A:
FIGS. 15A and 15B are photographs showing uni-directional ceramic matrix composite green body using VGCNT treated SiC yarn FIG. 15A and a melt-infiltrated ceramic matrix composite article fabricated there from FIG. 15B.
Figure 15B:

Carbon nanotubes were found to grown from the surfaces of the individual filaments within the ceramic grade silicon carbide fiber yarn and along its 5 m length. In FIGS. 15A and 15B below the SEM images show the nanotube growth on the 5 m length of ceramic grade silicon carbide fiber yarn. The 5 m length of yarn was used to fabricate a pre-ceramic polyimide matrix composite (unidirectional, fiber volume fraction of approximately 20%). The pre-ceramic composite was heated under flowing nitrogen to 800° C. to pyrolyze the matrix to carbon. Afterwards, the green body was melt infiltrated with pure silicon at 1500° C. under vacuum to form the ceramic matrix composite article. FIGS. 15A and B displays the ceramic matrix composite article fabricated by reactive melt infiltration. FIG. 15B is the same preparation as FIG. 15A but at a higher magnification.

Example 14—Continuous Growth of Carbon Nanotubes at Atmospheric Pressure on a 5 Meter Length of Ceramic Grade Silicon Carbide Fiber Yarn and Subsequent Purification A 100 mM Ferric Nitrate Nonahydrate (Fe(NO$_3$)$_3$.9H$_2$O) solution in isopropanol was prepared and allowed to stand for 24 hours. A 5 m length of as-received ceramic grade silicon carbide fiber yarn (Nicalon™ CG) was used. The 5 m length of yarn was level wound onto a glass spool and dipped into a bath of the catalyst solution with a residence time of approximately 1 minute then immediately dipped into a second bath of hexanes and dried in air at room temperature. The carbon nanotube growth on the continuous yarn was conducted in a 25 mm diameter quartz tube reactor 250 cm in length that was mounted into two separate tube furnaces with a 50 cm gap between the furnaces. Both tube furnaces were 40 cm in overall length. The spool of yarn was placed into a container fitted with a nitrogen gas inlet that was sealed to the quartz reaction tube at the "upstream" end of the tube such that the yarn was fed down the tube reactor through the furnaces and used to pull the continuous treated ceramic grade silicon carbide fiber yarn (Nicalon™ CG) through. In this way the inert nitrogen gas purges the yarn chamber and then flows down the reaction tube through the furnaces and out the downstream end open to the atmosphere. The first tube furnace was set to a temperature of 800° C. and the second set to a temperature of 820° C. Nitrogen flow was set to 500 sccm in the reactor system and maintained throughout the entire process. Acetylene was introduced through a gas fitting in the quartz tube in the gap between the tube furnaces at a flowrate of 5.0 sccm (1% concentration of acetylene in nitrogen). After a period of 15 minutes, to allow the reactor system to completely purge, the yarn was pulled through the entire length of quartz tube through the furnaces at a speed of 1.27 cm/minute and level wound onto a glass spool. After a period of approximately 7 hours the 5 m length of ceramic grade silicon carbide fiber yarn (Nicalon™ CG) had been pulled through the reactor.

Figure 16A:
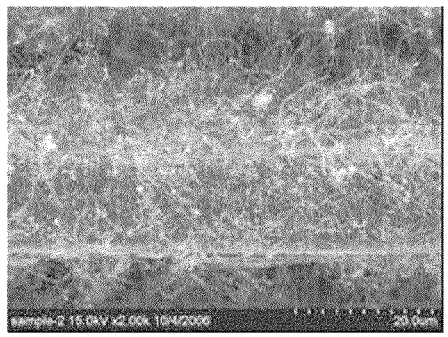
FIGS. 16A and 16B are electron micrographs of carbon nanotubes on a 5 m piece of SiC (Hi-Nicalon™) yarn using an $Fe(NO_3)_3 \cdot 9H_2O$/IPA catalyst solution followed by dipping in hexanes and subsequent cleaning by nitric acid reflux after growth.
Figure 16B:
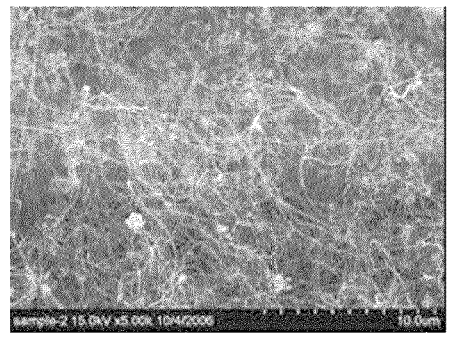

Carbon nanotubes were found to grown from the surfaces of the individual filaments in the ceramic grade silicon carbide fiber yarn along its 5 m length. The 5 m length of yarn wound on a glass spool was immersed into a flask of concentrated nitric acid and heated to reflux for 1 hour to clean the carbon nanotube treated yarn of residual metal catalyst and amorphous carbon deposits. The yarn was subsequently examined and the carbon nanotube growth covering the individual filaments of the ceramic grade silicon carbide fiber yarn was found to be substantially free of amorphous carbon and the carbon nanotubes were intact. FIG. 16A shows a segment of the yarn at 950× magnification. FIG. 16B shows the same preparation at 2,400× magnification.

Example 15—Continuous Growth of Carbon Nanotubes at Atmospheric Pressure on a 5 Meter Length of Ceramic Grade Silicon Carbide Fiber Yarn Using Cobalt Acetate Catalyst Precursor Solution A 100 mM Cobalt nitrate, $Co(NO_3)_2 \cdot 6H_2O$, solution in water was prepared and allowed to stand for 24 hours. A 5 m length of as-received ceramic grade silicon carbide fiber yarn (Nicalon™ CG). The 5 m length of yarn was level wound onto a glass spool and dipped into a bath of the catalyst solution with a residence time of approximately 1 minute and allowed to dry at room temperature. The carbon nanotube growth on the continuous yarn was conducted in a 25 mm diameter quartz tube reactor 250 cm in length that was mounted into two separate tube furnaces with a 50 cm gap between the furnaces. Both tube furnaces were 40 cm in overall length. The spool of yarn was placed into a container fitted with a nitrogen gas inlet that was sealed to the quartz reaction tube at the "upstream" end of the tube such that the yarn was fed down the tube reactor through the furnaces and used to pull the continuous treated ceramic grade silicon carbide fiber yarn through. In this way the inert nitrogen gas purges the yarn chamber and then flows down the reaction tube through the furnaces and out the downstream end open to the atmosphere. The first tube furnace was set to a temperature of 800° C. and the second set to a temperature of 820° C. Nitrogen flow was set to 500 sccm in the reactor system and maintained throughout the entire process. Acetylene was introduced through a gas fitting in the quartz tube in the gap between the tube furnaces at a flowrate of 5.0 sccm (1% concentration of acetylene in nitrogen). After a period of 15 minutes, to allow the reactor system to completely purge, the yarn was pulled through the entire length of quartz tube through the furnaces at a speed of 1.27 cm/minute and level wound onto a glass spool. After a period of approximately 7 hours the 5 m length of Nicalon™ CG had been pulled through the reactor.

Figure 17A:
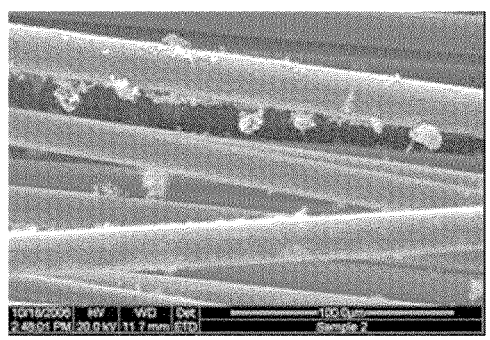
FIGS. 17A and 17B are electron micrographs showing VGCNT growth obtained on SiC (Nicalon™) yarns using cobalt acetate catalyst.
Figure 17B:
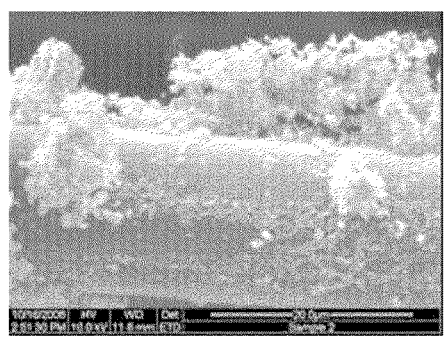

Carbon nanotubes were found to grown from the surfaces of the individual filaments in the ceramic grade silicon carbide fiber yarn along its 5 m length as shown in FIGS. 17A and 17B. The carbon nanotube filaments were uniformly dispersed along the ceramic fibers in the yarn.

Example 16—Growth of Carbon Nanotubes on Continuous Preform Materials Using Continuous Growth Process at a Variety of Variables Tables 2 and 3 illustrate the use of the invention using a variety variables. Table 2 shows the use of the invention with a variety of catalysts, solvents, concentrations and drying temperatures. Table 3 shows the use of the invention PVAC and BTDE additives to enhance the CNT growth.

TABLE 2

Catalyst Trials on Continuous Ceramic Yarn CNT Processes

| Metal Salt | Solvent | Concentration (mM) | Drying temperature | Duration of aging |
|---|---|---|---|---|
| Ferric nitrate $Fe(NO_3)_3 \cdot 9H_2O$ | Water | 50 and 100 | Room temperature and 70° C. | <1 hour, 24 hours |
| Ferric nitrate $Fe(NO_3)_3 \cdot 9H_2O$ | Ethyl Alcohol | 50 and 100 | Room temperature and 70° C. | <1 hour, 24 hours |
| Ferric nitrate $Fe(NO_3)_3 \cdot 9H_2O$ | Isopropyl Alcohol and post-dip in hexanes | 50 and 100 | Room temperature and 70° C. | <1 hour, 24 hours, 5 hours, >48 hours |

TABLE 2-continued

Catalyst Trials on Continuous Ceramic Yarn CNT Processes

| Metal Salt | Solvent | Concentration (mM) | Drying temperature | Duration of aging |
|---|---|---|---|---|
| Ferric nitrate $Fe(NO_3)_3 \cdot 9H_2O$ | Isopropyl alcohol and without post-dip in hexanes | 100 | Room temperature and 70° C. | <1 hour, 24 hours |
| Cobalt nitrate $Co(NO_3)_2 \cdot 6H_2O$ | Water | 50 and 100 | Room temperature and 70° C. | <1 hour, 24 hours |
| Cobalt nitrate $Co(NO_3)_2 \cdot 6H_2O$ | Ethyl alcohol | 50 and 100 | Room temperature and 70° C. | <1 hour, 24 hours |
| Cobalt nitrate $Co(NO_3)_2 \cdot 6H_2O$ | Isopropyl alcohol and post-dip in hexanes | 50 and 100 | Room temperature and 70° C. | <1 hour, 24 hours |
| Cobalt nitrate $Co(NO_3)_2 \cdot 6H_2O$ | Isopropyl alcohol and without post-dip in hexanes | 50 and 100 | Room temperature and 70° C. | <1 hour, 24 hours |
| Nickel nitrate $Ni(NO_3)_2 \cdot 6H_2O$ | Water | 100 | Room temperature and 70° C. | <1 hour, 24 hours |
| Nickel nitrate $Ni(NO_3)_2 \cdot 6H_2O$ | Ethyl alcohol | 100 | Room temperature and 70° C. | <1 hour, 24 hours |
| Nickel nitrate $Ni(NO_3)_2 \cdot 6H_2O$ | Isopropyl alcohol and post-dip in hexanes | 100 | Room temperature and 70° C. | <1 hour, 24 hours |
| Nickel nitrate $Ni(NO_3)_2 \cdot 6H_2O$ | Isopropyl alcohol and without post-dip in hexanes | 100 | Room temperature and 70° C. | <1 hour, 24 hours |

TABLE 3

Test matrix of experiments conducted with PVAC and BTDE additives to catalyst solution to improve wetting of Nicalon ™ and carbon fiber yarns.

| Specimen ID No. | Additive | Wt % Additive in Solution | Catalyst solution |
|---|---|---|---|
| 1 | BTDE[1] | 5.0/IPA | 100 mM $Fe(NO_3)_3$/IPA, no hexanes |
| 2 | BTDE | 5.0/IPA | 100 mM $Fe(NO_3)_3$/IPA, with hexanes |
| 3 | BTDE | 5.0/IPA | 100 mM $Fe(NO_3)_3$/acetone |
| 4 | BTDE | 0.5/IPA | 100 mM $Fe(NO_3)_3$/IPA, no hexanes |
| 5 | BTDE | 0.5/IPA | 100 mM $Fe(NO_3)_3$/IPA, with hexanes |
| 6 | BTDE | 0.5/IPA | 100 mM $Fe(NO_3)_3$/acetone |
| 7 | BTDE | 0.5/Acetone | 100 mM $Fe(NO_3)_3$/IPA, no hexanes |
| 8 | BTDE | 0.5/Acetone | 100 mM $Fe(NO_3)_3$/IPA, with hexanes |
| 9 | BTDE | 0.5/Acetone | 100 mM $Fe(NO_3)_3$/acetone |
| 10 | PVAC[2] | 1.0/Acetone | 100 mM $Fe(NO_3)_3$/acetone, no hexanes |
| 11 | PVAC | 0.5/Acetone | 100 mM $Fe(NO_3)_3$/acetone, no hexanes |
| 12 | PVAC | 5.0/IPA | 100 mM $Fe(NO_3)_3$/IPA |
| 13 | PVAC | 1.0/Acetone | 100 mM $Fe(NO_3)_3$/IPA, no hexanes |
| 14 | PVAC | 1.0/Acetone | 100 mM $Fe(NO_3)_3$/IPA, with hexanes |

[1]dimethylester of 3,3',4,4'-benzo-phenonetetracarboxylic acid
[2]PolyVinyl Acetate Example 17—Continuous Growth of Carbon Nanotubes on a 60 cm Length of Silicon Carbide Fiber Yarn (Hi-Nicalon™) at Atmospheric Pressure without Heat Treatment A 100 mM Ferric Nitrate Nonahydrate ($Fe(NO_3)_3 \cdot 9H_2O$) solution in an acetone and ethanol mixture (50/50) was prepared and allowed to stand for 24 hours. A 60 cm length of as-received silicon carbide fiber yarn was used for the continuous CNF growth process. The silicon carbide fiber yarn was soaked in the catalyst solution for 5 minutes and hung vertically to dry at room temperature. The dry catalyst treated yarn was then bonded to a 305 cm length of untreated ceramic grade silicon carbide fiber yarn (Nicalon™ CG) that served as a leader to continuously pull yarn through the reactor at a controlled speed. The treated silicon carbide fiber yarn was then placed into a 25 mm diameter quartz tube in a tube furnace at 500° C. under a nitrogen flow of 500 sccm for pyrolysis of the catalyst at a residence time of 15 minutes and the "downstream" end of the quartz tube was open to the atmosphere. The carbon nanotube growth on the continuous yarn was conducted in a 25 mm diameter quartz tube reactor that was mounted in a tube furnace. The furnace was 80 cm in overall length. The spool of yarn was placed into a container fitted with a nitrogen gas inlet that was sealed to the quartz reaction tube at the upstream end of the tube such that the untreated ceramic grade silicon carbide fiber leader was fed down the tube reactor through the furnaces to be used to pull the continuous treated silicon carbide fiber yarn through. In this way the inert nitrogen gas purges the yarn chamber and then flows down the reaction tube through the furnace and out the downstream end open to the atmosphere. The furnace was set to a temperature of 820° C. Nitrogen flow was set to 500 sccm in the reactor system and acetylene flow was set to 5 sccm and maintained throughout the entire process. After a period of 15 minutes to allow the reactor system to completely purge, the pyrolyzed catalyst treated yarn was pulled through the entire length of the furnaces at a speed of 0.635 cm/minute corresponding to a residence time of 92 minutes in the tube furnace reactor. When the Hi-Nicalon® yarn exited the tube furnace, the acetylene flow was stopped and the reactor cooled under nitrogen purge.

Figure 18A:
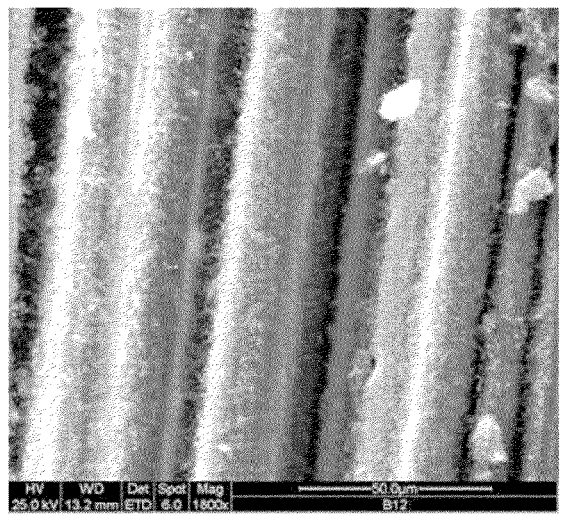
FIGS. 18A and 18B are SEM images showing VGCNT grown on SiC fiber (Hi-Nicalon™).
Figure 18B:
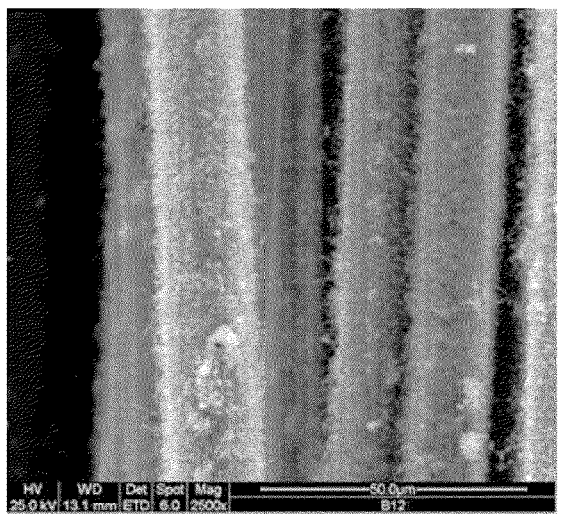

Carbon nanotubes were found uniformly grown from the surfaces of the individual filaments in the silicon carbide fiber yarn along the entire length of the yarn. In FIGS. 18A and 18B, the scanning electron microscope images show the nanotube growth for the segment of silicon carbide fiber 58.4 cm from the leading edge at 540× magnification (FIG. 18A) and 58.4 cm from the leading edge at 750× magnification (FIG. 18B).

Example 18—Continuous Growth of Carbon Nanotubes on Multiple Silicon Carbide Fiber Continuous Yarns Simultaneously at Atmospheric Pressure Without a Separate Pyrolysis Process Step to Demonstrate Scale-Up of the Manufacturing Process A 100 mM Ferric Nitrate Nonahydrate ($Fe(NO_3)_3 \cdot 9H_2O$) solution in ethanol mixture was prepared and allowed to stand for 24 hours. Three 5 m lengths of as-received silicon carbide (SiC) fiber (Nicalon™ CG) yarn were used simultaneously for the continuous CNT growth process. The individual 5 m SiC yarns were level wound onto 25 mm diameter glass spools and soaked in the catalyst solution for 5 minutes then placed in a convection oven at 50° C. until dry. The carbon nanotube growth on the multiple continuous yarns was conducted in a 25 mm diameter quartz tube reactor, 1830 cm in overall length, that was mounted into two separate tube furnaces (40 cm in overall length each) with a 50 cm space between the furnaces. The entrance end of the quartz tube was fitted with an adapter with three 5 mm diameter holes equally spaced in across the diameter at the midpoint of the tube. Each hole was covered with a silicone rubber septum that was slit to allow the yarn to enter but keep air out of the tube furnace. The three spools of catalyst precursor treated SiC yarn were mounted on a spindle before the entrance to the quartz tube to allow rotation and to allow the yarn to be unwound as it was pulled continuously through the tube furnace reactor set-up continuously at a controlled speed. The SiC yarns were threaded through the septa, through the first tube furnace, through an aluminum bushing located in the quartz tube between the two furnaces with three equally spaced holes across the diameter at the midpoint of the tube ID, through the second tube furnace and attached to a level winding mechanism that pulled the three yarns through the quartz tube a controlled rate. The first tube furnace was set to a temperature of 800° C. and the second tube furnace was set to a temperature of 820° C. Nitrogen was introduced into a fitting at the yarn entrance to the quartz tube and flow was set to 500 sccm and maintained throughout the entire process. Acetylene was introduced into a fitting in the quartz tube between the tube furnaces and the flow was set to 2 sccm and maintained throughout the entire process. After a period of 15 minutes to allow the reactor system to completely purge, the catalyst treated yarns were pulled through the entire length of the furnaces at a speed of 1.27 cm/minute corresponding to a residence time of 31.5 minutes in the tube furnace reactor. After a period of operation for approximately 6.5 hours, when the SiC yarns exited the tube furnace, the acetylene flow was stopped and the reactor cooled under nitrogen purge.

Carbon nanofibers were found uniformly grown from the surfaces of the individual filaments in the yarns along the entire length of the yarns that were pulled through the entire process set-up (approximately the first 1 m of SiC yarn did not have VGCNT since it was used as the leader to pull the yarns through).

Those of skill in the art will appreciate that, while the above example discloses the use of multiple continuous fiber yarns, of the same type, processed concurrently, it is within the scope of the invention to process different types of continous fiber preforms concurrently. Thus, for example, the yarns may include silicon carbide, quartz, metal, glass or ceramic, without limitation. Further, it should be appreciated that by "processed together" the multiple yarns may undergo the entire process of nanotube growth, e.g., dispersal of catalyst precursor; conversion of the catalyst precursor While this invention has been described in conjunction with the various exemplary embodiments outlined above, various alternatives, modifications, variations, improvements, and/or substantial equivalents, whether known or that are or may be presently unforeseen, may become apparent to those having at least ordinary skill in the art. Accordingly, the exemplary embodiments according to this invention, as set forth above, are intended to be illustrative, not limiting. Various changes may be made without departing from the spirit and scope of the invention. Therefore, the invention is intended to embrace all known or later-developed alternatives, modifications, variations, improvements, and/or substantial equivalents of these exemplary embodiments.

REFERENCES

Hernadi, et al., "Fe Catalyzed Carbon Nanotube Formation," Carbon, 34(10), 1249, 1996.

Yacaman, M. J. et al., "Catalytic Growth of Carbon Microtubules with Fullerene Structure," Applied Physics Letters, 62, 657, 1993.

Ivanov, et al., "Catalytic Production and Purification of Nano-tubules Having Fullerene Scale Diameters," Carbon, 33(12), 1727, 1995.

Wang, et al., "Controlled Growth of Carbon Nanotubes On Graphite Foil by Chemical Vapor Deposition," Chem. Phys. Letters, 335, 141, 2002.

Thostenson, E. T., et al., "Carbon Nanotube/Carbon Fiber Hybrid Multi-Scale Composites," Journal of Applied Physics, 91(9), 6034, 2002.

Tibbetts, et al., "Apparatus for Forming Carbon Fibers," U.S. Pat. No. 5,024,818, Jun. 18, 1991.

Alig, et al., "Method for Forming Carbon Fibers," U.S. Pat. No. 5,374,415, Dec. 20, 1994.

Tennent, et al., "Carbon Fibrils and Method for Producing Same," U.S. Pat. No. 5,165,909, Nov. 24, 1992.

Tennent, et al., "Carbon Fibrils, Methods for Producing Same and Adhesive Compositions Containing Same," U.S. Pat. No. 6,235,674, May 22, 2001.

Ren et al., Effect of temperature on growth and structure of CNT by chemical vapor deposition Applied Physics A, 2002, 74, Pg 397-402.

Hernadi, Fonesca et al. Synthesis of Single wall and Multi wall carbon nanotubes over supported catalysts Applied Physics A, 1998, Volume 67, Pg 11-22.

Hernadi, Fonesca et al. Optimization of catalytic production and purification of buckytubes Journal of Molecular Catalysis—A: Chemical, 107, 1996 Pg 159-168

What is claimed is:

1. A continuous process for producing a carbon nanotube reinforced continuous fiber preform useful in the manufacture of carbon nanotube reinforced composite articles, comprising steps of:

(a) dispensing a continuous fiber preform from a spool;

(b) dispersing a catalyst precursor in solution throughout the continuous fiber preform;

(c) converting the catalyst precursor into catalytic particles, the catalytic particles dispersed throughout the continuous fiber preform;

(d) continually moving the treated preform through a growth furnace;

(e) contacting the continuous fiber preform containing the catalytic particles with a hydrocarbon precursor gas;

(f) growing vapor grown carbon nanotubes (VGCNT) in situ from the catalytic particles dispersed throughout the preform, without vaporization of the preform; and (g) producing a spoolable carbon nanotube reinforced preform comprising a plurality of continuous fiber filaments, the filaments being at least one filament type selected from the group consisting of: quartz, glass, ceramic, metal, and carbon, wherein the VGCNT is infused within and among the continuous fiber filaments.

2. The process of claim 1, wherein the catalyst precursor comprises at least one catalyst precursor selected from the group consisting of iron, nickel, cobalt, copper, chromium, molybdenum, and a salt.

3. The process of claim 2, wherein the solvent for the catalyst precursor in solution comprises at least one solvent selected from the group consisting of acetone, ethanol, isopropanol, hexane, methanol, and water.

4. The process of claim 1, wherein the catalyst precursor is at least one catalyst precursor selected from the group consisting of iron acetate, iron nitrate, iron oxalate, nickel acetate, nickel nitrate, nickel oxalate, cobalt acetate, cobalt nitrate, and cobalt oxalate.

5. The process of claim 1, wherein the catalyst precursor solution comprises a solution of iron (III) nitrate nonahydrate (ferric nitrate) and further comprises at least one solvent selected from the group consisting of ethanol and acetone.

6. The process of claim 1, wherein the preform is at least one continuous multi-filament preform selected from the group consisting of: braid, weave, yarn and tow.

7. The process of claim 1, wherein the step of converting the catalyst precursor into catalytic particles comprises pryrolyzing the catalyst precursor treated preform to form catalytic particles within the preform in a pyrolysis furnace.

8. The process of claim 7, wherein the pyrolysis further removes organic content from the preform.

9. The process of claim 7, wherein the pyrolysis furnace includes and inlet and an outlet and a mechanism for continuously taking up the continuous preform as it exits the furnace.

10. The process of claim 9, wherein the pyrolysis furnace further includes a mechanism for continuously belaying the continuous fiber preform into the pyrolysis furnace and wherein the rate of belaying and taking up are approximately equal.

11. The process of claim 7, wherein the pyrolysis of the catalyst precursor takes place at between about 300° C. and 900° C.

12. The process of claim 7, wherein the pyrolysis of the catalyst precursor takes place in an inert or oxidizing gas atmosphere.

13. The process of claim 12, wherein the pyrolysis of the catalyst precursor takes place in an argon or nitrogen atmosphere.

14. The process of claim 7, wherein the pyrolysis of the catalyst precursor takes place from, between 1 second to 30 minutes.

15. The process of claim 14, wherein the pyrolysis of the catalyst precursor takes place at from about 1 minute to about 15 minutes.

16. The process of claim 7, wherein the pyrolysis of the catalyst precursor takes place at from about 500° C. to about 600° C.

17. The process of claim 7, wherein the pyrolyzed preform is fed in to a front-end of a growth furnace with a precursor gas to induce growth of carbon nanotubes.

18. The process of claim 17, wherein the fed-in preform is taken-up at a rear-end of the furnace.

19. The process of claim 18, wherein the residence time of the preform through the growth furnace is approximately between about 1 minute to 1000 minutes.

20. The process of claim 19, wherein the residence time of the preform through the growth furnace is between about 1 minutes and 120 minutes.

21. The process of claim 17, wherein the pyrolyzed preform has a heat treatment step prior to induction of nanotube growth.

22. The process of claim 21, wherein the heat treatment step and the nanotube growth step occur in the same furnace.

23. The process of claim 21, wherein the nanotube growth step occurs sequentially after the heat treatment step.

24. The process of claim 21, wherein the heat treatment step occurs at a temperature of about approximately 600° C. to about 900° C.

25. The process of claim 24, wherein the heat treatment step occurs at a temperature of about 800° C.

26. The process of claim 21, wherein the heat treatment step happens in an inert atmosphere.

27. The process of claim 21, wherein the wherein the growth furnace is a two-zone furnace and heat treatment occurs in a first zone and nanotube growth occurs in a second zone.

28. The process of claim 27, wherein each zone has a different temperature.

29. The process of claim 27, wherein the hydrocarbon precursor gas is entered into the furnace after the heat treatment zone.

30. The process of claim 27, wherein the hydrocarbon precursor is entered into the furnace before the heat treatment zone but is not mixed with the purge gas until the second zone.

31. The process of claim 17, wherein the nanotube growth step occurs at a temperature of about approximately 700° C. to about 950° C.

32. The process of claim 31, wherein the nanotube growth step occurs at a temperature of about 750° C. to about 850° C.

33. The process of claim 17, wherein the precursor gas has a flow velocity in the furnace of approximately about 10 to 1000 cm/min.

34. The process of claim 33, wherein the flow velocity in the furnace is approximately about 100 to 150 cm/min.

35. The process of claim 17, wherein the precursor gas is provided in a reactive gas composition comprising about approximately 0.1% to 10% hydrocarbon precursor gas in 99.9% to 90% inert gas.

36. The process of claim 35, wherein the precursor gas is provided in a reactive gas composition comprising about approximately 0.5% to 2% hydrocarbon precursor gas in 99.5% to 98% inert gas.

37. The process of claim 36, wherein the precursor gas is provided in a reactive gas composition comprising about approximately 1% hydrocarbon precursor gas in 99% inert gas.

38. The process of claim 37, wherein the reactive gas composition is 1% acetylene in nitrogen.

39. The process according to claim 1 wherein step (b) is carried out under reducing conditions.

40. The process of claim 1, wherein the hydrocarbon precursor gas is at least one gas selected from a group consisting of acetylene, methane, propane, ethane, ethylene, benzene, and natural gas.

41. The process of claim 1, wherein multiple preforms are processed concurrently.

42. A process for providing a carbon nanotube reinforced composite article comprising steps of:
  (a) dispensing a continuous fiber preform from a spool;
  (b) dispersing a catalyst precursor throughout a continuous fiber preform;
  (c) converting the catalyst precursor into catalytic particles, the catalytic particles dispersed throughout the continuous fiber preform;
  (d) continually moving the treated preform through a pyrolysis furnace;
  (e) contacting the continuous fiber preform containing the catalytic particles with a hydrocarbon precursor gas;
  (f) growing vapor grown carbon nanotubes (VGCNT) in situ from the catalytic particles dispersed throughout the preform, the VGCNT infused in the preform to yield a VGCNT reinforced continuous fiber preform; and
  (g) infusing the carbon reinforced continuous fiber preform with at least one matrix composite material selected from the group consisting of: thermoplastic polymer, thermoset polymer, thermoplastic polymer resin, thermoset polymer resin, metal, ceramic, ceramic precursor, and amorphous glass.

43. A carbon nanotube reinforced continuous fiber preform produced by the process of:
  (a) dispensing a continuous fiber preform from a spool;
  (b) dispersing a solution of catalyst precursor throughout the continuous fiber preform;
  (c) converting the catalyst precursor into catalytic particles, the catalytic particles dispersed throughout the continuous fiber preform;
  (d) continually moving the continuous fiber preform through a growth furnace;
  (e) contacting the continuous fiber preform containing the catalytic particles with a hydrocarbon precursor gas; and
  (f) growing vapor grown carbon nanotubes (VGCNT) in situ from the catalytic particles dispersed throughout the preform, without vaporization of the preform;
  wherein the carbon nanotube reinforced preform is spoolable and comprises a plurality of continuous fiber filaments, the filaments being quartz, glass, ceramic, metal, carbon or combinations thereof, and wherein the VGCNT is infused within and among the continuous fiber filaments to yield a carbon nanotube reinforced continuous fiber preform.

44. The carbon nanotube reinforced continuous fiber preform of claim 43, wherein the fiber preform is carbon, quartz, glass, ceramic or metal multi filament yarn, tow, braid or weave.

45. A carbon nanotube reinforced composite article produced by a process of: (a) dispensing a continuous fiber preform from a spool;
  (b) dispersing a solution of catalyst precursor throughout the continuous fiber preform;
  (c) converting the catalyst precursor into catalytic particles, the catalytic particles dispersed throughout the continuous fiber preform;
  (d) continually moving the preform through a pyrolysis furnace;
  (e) contacting the continuous fiber preform containing the catalytic particles with a hydrocarbon precursor gas;
  (f) growing vapor grown carbon nanotubes (VGCNT) in situ from the catalytic particles dispersed throughout the continuous fiber preform, the VGCNT infused in the preform to yield a VGCNT reinforced continuous fiber preform; and
  (g) infusing the vapor grown carbon nanotube reinforced continuous fiber preform with a thermoplastic or thermoset polymer, thermoplastic or thermoset polymer resin, metal, ceramic, ceramic precursor, or amorphous glass to provide a carbon nanotube reinforced composite article.

46. A continuous carbon nanotube reinforced continuous fiber preform useful in the manufacture of carbon nanotube reinforced composite articles, comprising:
  (a) a spoolable continuous fiber preform comprising a plurality of continuous fiber filaments, wherein no portion of said preform has undergone vaporization; and
  (b) vapor grown carbon nanotubes (VGCNT) dispersed throughout said continuous fiber preform, the VGCNT infused within and among the continuous fiber filaments.

47. The spoolable carbon nanotube reinforced continuous fiber preform of claim 46, wherein the continuous fiber preform is quartz, glass ceramic, metal, carbon or combinations thereof.

* * * * *